US012666519B2

(12) United States Patent
Katsurada

(10) Patent No.: US 12,666,519 B2
(45) Date of Patent: Jun. 23, 2026

(54) ION BALANCE SENSOR AND STATIC ELIMINATION SYSTEM

(71) Applicant: Keyence Corporation, Osaka (JP)

(72) Inventor: Masaaki Katsurada, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 362 days.

(21) Appl. No.: 18/230,243

(22) Filed: Aug. 4, 2023

(65) Prior Publication Data

US 2024/0080961 A1 Mar. 7, 2024

(30) Foreign Application Priority Data

Sep. 7, 2022 (JP) ................................ 2022-142582
Nov. 4, 2022 (JP) ................................ 2022-177304

(51) Int. Cl.
*H05F 3/06* (2006.01)
*H05F 3/04* (2006.01)

(52) U.S. Cl.
CPC ................ *H05F 3/06* (2013.01); *H05F 3/04* (2013.01)

(58) Field of Classification Search
CPC .................................... H05F 3/06; H05F 3/04
USPC .......................................................... 361/230
See application file for complete search history.

(56) References Cited

U.S. PATENT DOCUMENTS 4,064,548 A * 12/1977 Best .......................... H05F 3/04 361/231
4,630,167 A * 12/1986 Huggins ................... H05F 3/04 361/231
4,740,862 A * 4/1988 Halleck .................. G01R 29/24 361/231
5,930,105 A * 7/1999 Pitel ........................ H01T 23/00 361/213
7,649,728 B2 1/2010 Fujita et al.
8,587,917 B2 11/2013 Fujita
9,084,334 B1 * 7/2015 Gefter ....................... H05F 1/00
9,859,090 B2 * 1/2018 Gefter ................ H01J 37/3002

(Continued)

FOREIGN PATENT DOCUMENTS

JP 10-289796 A 10/1998
JP 2007258108 A 10/2007

OTHER PUBLICATIONS

U.S. Appl. No. 18/230,223, filed Aug. 4, 2023 (75 pages).
U.S. Appl. No. 18/230,232, filed Aug. 4, 2023 (84 pages).
U.S. Appl. No. 18/230,238, filed Aug. 4, 2023 (109 pages).

*Primary Examiner* — Dharti H Patel
(74) *Attorney, Agent, or Firm* — Kilyk & Bowersox, P.L.L.C.

(57) ABSTRACT

To provide an ion balance sensor and a static elimination system capable of grasping further information regarding an environment of a target space in addition to ion balance in the target space. The ion balance sensor includes a detection plate that is conductive and arranged in a target space. In the ion balance sensor, ion balance in the target space is detected based on a potential of the detection plate. An ion balance signal indicating a detection result is generated. Further, a physical quantity related to an environment of the target space is detected in addition to the ion balance. Another signal indicating information regarding the environment of the target space is generated based on a detection result. The ion balance signal and the other signal are output.

10 Claims, 15 Drawing Sheets

(56) References Cited

U.S. PATENT DOCUMENTS

| | | | | |
|---|---|---|---|---|
| 2005/0168907 | A1* | 8/2005 | Sekoguchi | F24F 3/1423 361/230 |
| 2012/0069485 | A1* | 3/2012 | Riskin | H01T 23/00 361/230 |
| 2018/0038745 | A1* | 2/2018 | Madden | G01L 11/00 |
| 2024/0080961 | A1* | 3/2024 | Katsurada | H05F 3/06 |

* cited by examiner

ION BALANCE SENSOR AND STATIC ELIMINATION SYSTEM

CROSS-REFERENCE TO RELATED APPLICATIONS

The present application claims foreign priority based on Japanese Patent Application No. 2022-142582, filed Sep. 7, 2022, and No. 2022-177304, filed Nov. 4, 2022, the contents of which are incorporated herein by references.

BACKGROUND OF THE INVENTION

1. Field of the Invention

The invention relates to an ion balance sensor detecting an ion balance of a target space and a static elimination system.

2. Description of Related Art

In manufacturing lines of a semiconductor device, a liquid crystal display device, and the like, when each of parts to be used for manufacturing is charged, a product yield is likely to decrease due to foreign matter adhering to the part. In order to suppress the decrease in the yield caused by charging of each of the parts, a static eliminator is used.

In a static elimination device (static eliminator) described in JP 2007-258108 A, air containing positive ions and negative ions is ejected from a nozzle toward an object to be neutralized. Further, in the static elimination device, ion balance around the object to be neutralized is measured. The amount of positive ions and the amount of negative ions to be supplied from the nozzle to the object to be neutralized are adjusted based on a result of the measurement.

As a result, an electric charge accumulated in an object to be neutralized is removed.

In the above-described static elimination device, the ion balance is measured in order to appropriately adjust static elimination conditions. However, the adjustment for making the static elimination conditions appropriate is not limited to adjusting the amount of positive ions and the amount of negative ions to be supplied to the object to be neutralized.

For example, when air containing positive ions and negative ions is ejected to a position shifted from the object to be neutralized because an orientation of the nozzle is not appropriately set, it is difficult to appropriately eliminate static electricity of the object to be neutralized. In this case, it is desirable to adjust the orientation of the nozzle. Alternatively, when a temperature environment or a humidity environment of a space surrounding the object to be neutralized is in a state where the object to be neutralized is easily charged, the static elimination efficiency decreases. In this case, it is desirable to adjust the temperature environment or the humidity environment of the space surrounding the object to be neutralized. In this manner, more information regarding the environment of the space (target space) surrounding the object to be neutralized is required in order to enable various adjustments for making the static elimination conditions appropriate.

SUMMARY OF THE INVENTION

An object of the invention is to provide an ion balance sensor and a static elimination system capable of grasping further information regarding an environment of a target space in addition to ion balance in the target space.

According to one embodiment of the invention, an ion balance sensor includes: a detection plate that is conductive and is arranged in a target space; a first information generation unit that detects ion balance in the target space based on a potential of the detection plate and generates a first information signal indicating a detection result; a second information generation unit that detects a physical quantity related to an environment of the target space and generates a second information signal indicating information regarding the environment of the target space based on a detection result; and a sensor communication unit that outputs the first information signal and the second information signal.

According to one embodiment of the invention, an ion balance sensor includes: a detection plate that is conductive; a fixed resistor; a modulation voltage source that is electrically connected to a node, electrically connected to the detection plate, via the fixed resistor and generates a modulation voltage having periodicity; and a potential detection unit that detects a potential of the node over time.

According to one embodiment of the invention, a static elimination system includes: a static eliminator that outputs ions toward a target space where static elimination is to be performed; and an ion balance sensor connectable to the static eliminator. The ion balance sensor includes: a detection plate that is conductive and arranged in the target space; a first information generation unit that detects ion balance in the target space based on a potential of the detection plate and generates a first information signal indicating a detection result; a second information generation unit that detects a physical quantity related to an environment of the target space and generates a second information signal indicating information regarding the environment of the target space based on a detection result; and a sensor communication unit that outputs the first information signal and the second information signal to the static eliminator. The static eliminator includes: an ion generation unit that generates the ions to be output toward the target space; a static eliminator communication unit that receives the first information signal and the second information signal output from the sensor communication unit of the ion balance sensor; an ion control unit that controls the ion generation unit based on the first information signal received by the static eliminator communication unit; and an environmental state storage unit that stores the information regarding the environment of the target space based on the second information signal received by the static eliminator communication unit.

According to the invention, it is possible to grasp further information regarding the environment of the target space in addition to the ion balance in the target space.

DETAILED DESCRIPTION OF PREFERRED EMBODIMENTS

Hereinafter, an ion balance sensor and a static elimination system according to one embodiment of the invention will be described with reference to the drawings.

Figure 1:
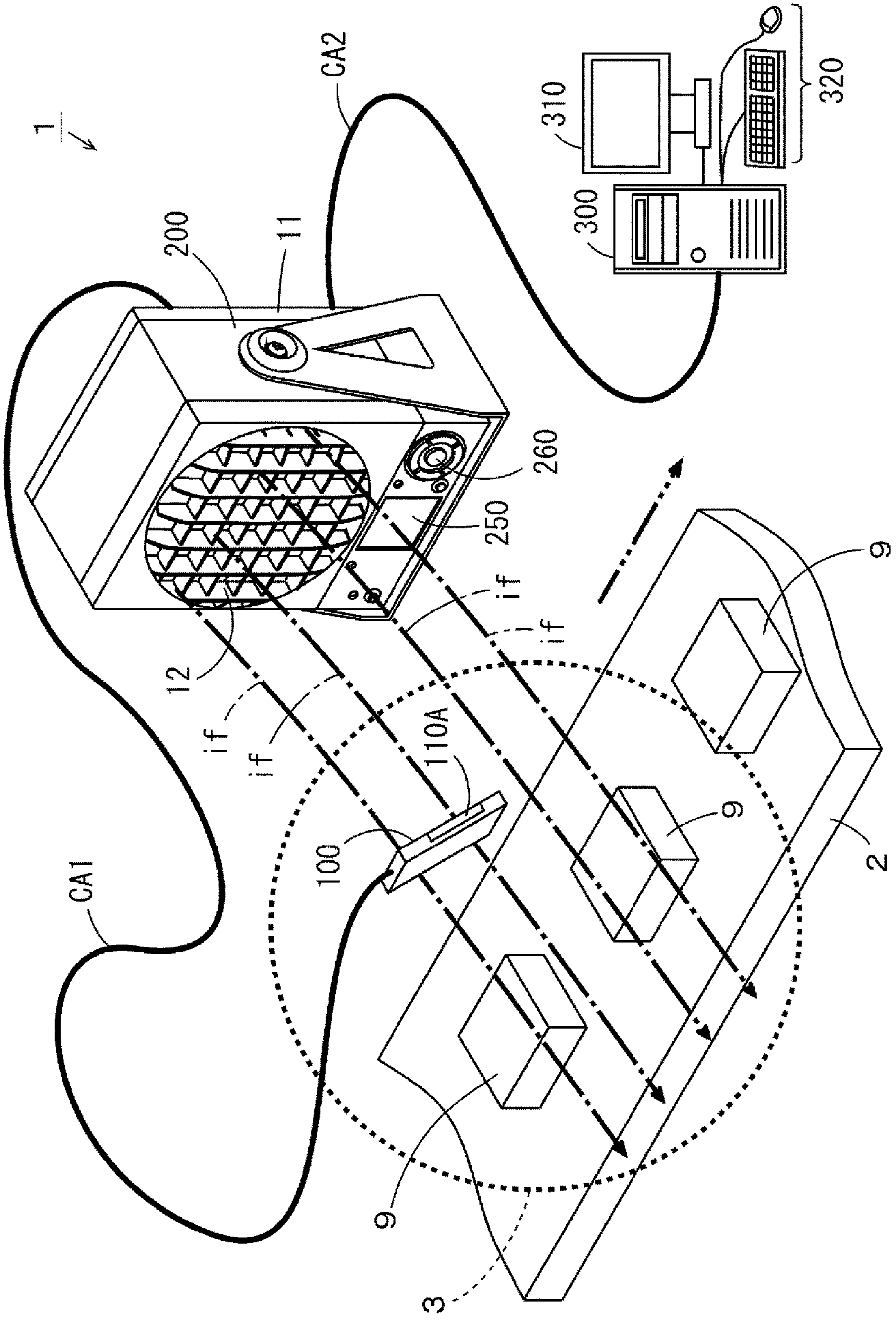
FIG. 1 is a diagram for describing an outline of a configuration and a use example of a static elimination system according to one embodiment of the invention.

1. Outline of Configuration of Static Elimination System and Use Examples Thereof FIG. 1 is a diagram for describing an outline of a configuration and a use example of the static elimination system according to one embodiment of the invention. As illustrated in FIG. 1, a static elimination system 1 according to the present embodiment mainly includes an ion balance sensor 100, a static eliminator 200, and a processing device 300.

The static eliminator 200 includes a static eliminator housing 11, and has a configuration in which various high voltage circuits and the like for generating positive ions and negative ions are accommodated in the static eliminator housing 11. An air outlet 12 is formed in the static eliminator housing 11. The static eliminator 200 sends out positive ions and negative ions generated inside the static eliminator housing 11 to the outside of the static eliminator 200 through the air outlet 12. In FIG. 1, the flow of a static elimination gas (in this example, air containing positive ions and negative ions) flowing from the air outlet 12 of the static eliminator housing 11 to the outside of the static eliminator 200 is indicated by a plurality of thick dashed-dotted arrows if.

In the following description, a space to which the static elimination gas sent out from the static eliminator 200 is to be supplied, that is, a static elimination target space in which static elimination of an object 9 is to be performed is referred to as a target space. In the example of FIG. 1, the static eliminator 200 is provided on an installation surface (not illustrated) such that the static elimination gas flows in the target space 3 including a part of a belt conveyor 2. In this case, when the belt conveyor 2 is operated to move a plurality of the objects 9 in a direction of the belt conveyor 2 (see a thick two-dot chain line arrow in FIG. 1), each of the objects 9 is neutralized by the static elimination gas when passing through the target space 3.

If there is a bias in ion balance in the target space 3, it is difficult to eliminate static electricity of each of the objects 9. Therefore, the ion balance sensor 100 is provided in the target space 3 in order to detect the ion balance in the target space 3. In the present embodiment, the ion balance in the target space 3 is a degree of the bias of an electrical polarity in the target space 3. Since the ion balance sensor 100 is provided in the target space 3, the ion balance in the target space 3 through which the object 9 passes is locally detected. Therefore, in a case where the static eliminator 200 is controlled using the ion balance detected by the ion balance sensor 100, it is possible to more appropriately eliminate the static electricity of the object 9.

The ion balance in the target space 3 approaches zero, for example, in a case where the amount of positive ions and the amount of negative ions contained in the static elimination gas flowing from the static eliminator 200 to the target space 3 are equal or substantially equal. On the other hand, the ion balance in the target space 3 deviates (is biased) from zero, for example, due to a difference between the amount of positive ions and the amount of negative ions contained in the static elimination gas flowing from the static eliminator 200 to the target space 3. The ion balance sensor 100 includes a detection plate 110A having a conductivity. The ion balance in the target space 3 is detected based on a potential of the detection plate 110A. Details of a structure of the ion balance sensor 100 will be described later.

Since the ion balance sensor 100 according to the present embodiment is provided in the target space 3, it is possible to detect information regarding an environment of the target space 3 in addition to the ion balance in the target space 3. Specifically, the ion balance sensor 100 can detect the amount of ions flowing in the target space 3 per unit time period (hereinafter, referred to as an ion current of the target space 3) as the information regarding the environment of the target space 3. Furthermore, the ion balance sensor 100 can detect the temperature and the humidity of the target space 3 as the information regarding the environment of the target space 3.

The ion balance sensor 100 includes a relay cable CA1. A distal end portion (one end portion) of the relay cable CA1 extending from the ion balance sensor 100 is connected to the static eliminator 200. Various types of the information detected by the ion balance sensor 100 are transmitted to the static eliminator 200 through the relay cable CAL In this case, the static eliminator 200 can adjust a positive ion generation state and a negative ion generation state in the static eliminator 200 based on a detection result of the ion balance in the target space 3. As a result, static elimination gases suitable for eliminating static electricity of the plurality of objects 9 are supplied to the target space 3.

Here, when the air outlet 12 of the static eliminator 200 faces a position shifted from the target space 3, the static elimination gas does not flow from the static eliminator 200 to the target space 3. In this case, the ion current is detected as zero or a value close to zero. On the other hand, when the air outlet 12 of the static eliminator 200 faces the target space 3, the static elimination gas appropriately flows from the static eliminator 200 to the target space 3. In this case, the ion current is detected as a value corresponding to the amount of ions contained in the static elimination gas.

Therefore, the static eliminator 200 can determine whether or not a position and a posture (an installation state) of the static eliminator 200 are appropriate based on a detection result of the ion current. Specifically, when the value of the ion current is equal to or less than a predetermined ion current threshold, it can be determined that the installation state of the static eliminator 200 is not appropriate. Further, when the value of the ion current is more than the ion current threshold, it can be determined that the installation state of the static eliminator 200 is appropriate. When such a determination result is presented to a user, the user can easily grasp the necessity of adjustment of the installation state of the static eliminator 200.

Furthermore, the static eliminator 200 can manage a change in an environmental state of the target space 3 during the static elimination of the plurality of objects 9 by storing detection results of the temperature and the humidity of the target space 3 in a memory.

The static eliminator 200 is connected to the processing device 300 via a relay cable CA2. The processing device 300 is, for example, a personal computer, and includes, for example, a central processing unit (CPU), a read only memory (ROM), and a random access memory (RAM). A main body display unit 310 and a main body operation unit 320 are connected to the processing device 300. The main body display unit 310 is configured using a liquid crystal display (LCD) panel or an organic electroluminescence (EL) panel. The main body operation unit includes a keyboard and a pointing device, and is configured to be operable by the user.

The processing device 300 is used, for example, to set various operation conditions for the static eliminator 200, monitor an operation state of the static eliminator 200, and the like. A plurality of the operation conditions of the static eliminator 200 include a flow rate (air volume) of a gas sent to the target space 3 by a fan 201 (FIG. 3), which will be described later, of the static eliminator 200, output conditions of various signals output from the static eliminator 200 to the processing device 300, a condition for disabling an operation of an operation unit 260 (FIG. 3), which will be described later, in the static eliminator 200, and the like.

2. Basic Configuration of Ion Balance Sensor 100

Figure 2:
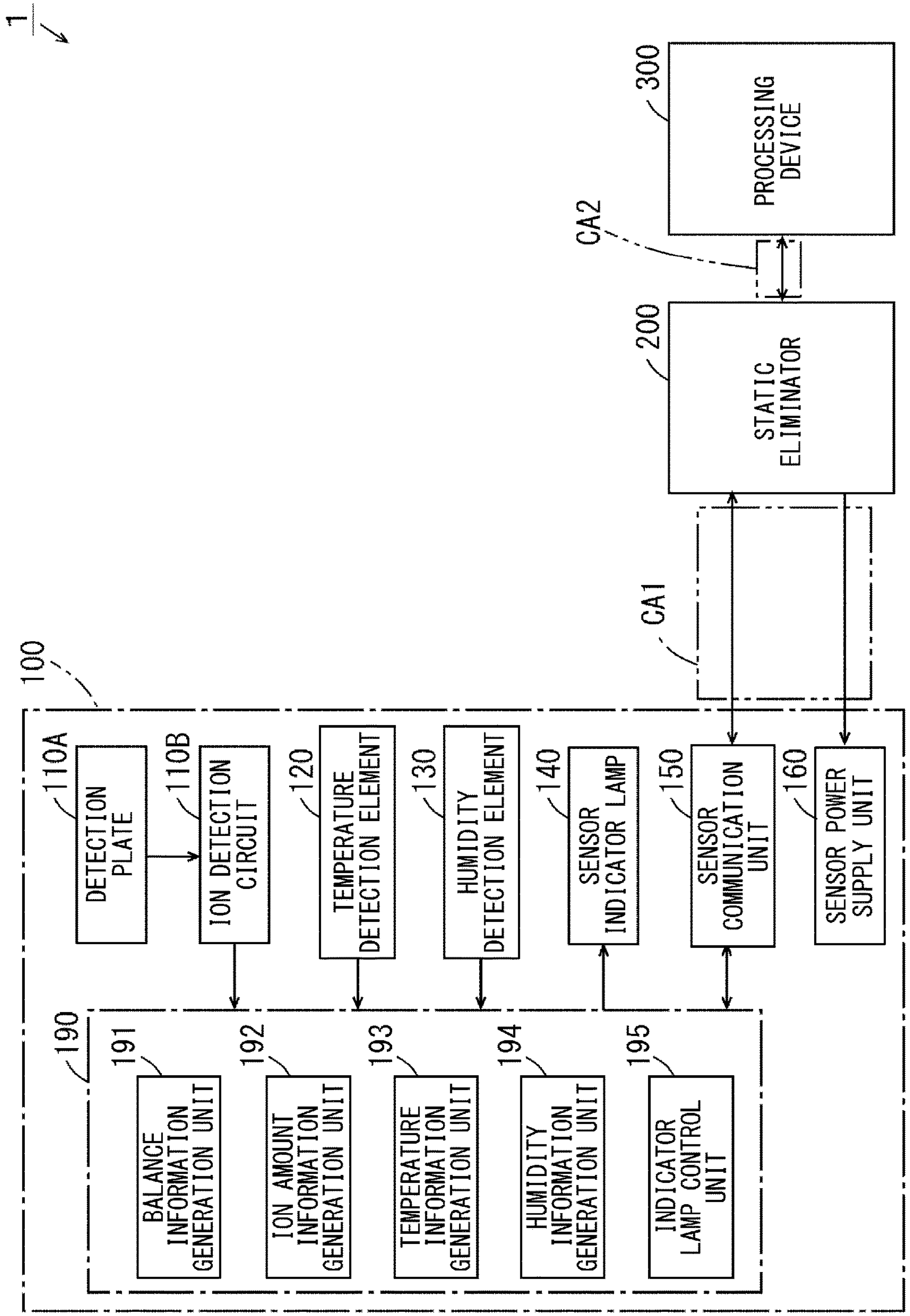
FIG. 2 is a block diagram of the static elimination system for describing a basic configuration of an ion balance sensor of FIG. 1.

FIG. 2 is a block diagram of the static elimination system 1 for describing a basic configuration of the ion balance sensor 100 of FIG. 1. As illustrated in FIG. 2, the ion balance sensor 100 includes a detection plate 110A, an ion detection circuit 110B, a temperature detection element 120, a humidity detection element 130, a sensor indicator lamp 140, a sensor communication unit 150, a sensor power supply unit 160, and a sensor control unit 190.

The detection plate 110A is made of a conductive material (for example, a metal material), and is provided so as to be exposed in a space surrounding the ion balance sensor 100. The ion detection circuit 110B is connected to the detection plate 110A, and outputs a signal corresponding to ion balance and an ion current in a target space 3 based on a temporal change in a potential of the detection plate 110A. A specific configuration of the ion detection circuit 110B will be described later.

The temperature detection element 120 is, for example, a semiconductor temperature sensor, and outputs a signal corresponding to the temperature of the space (target space 3) surrounding the ion balance sensor 100. The humidity detection element 130 is, for example, a polymer humidity detection element, and outputs a signal corresponding to the humidity of the space (target space 3) surrounding the ion balance sensor 100. The temperature detection element 120 may be a thermocouple or a resistance temperature detector.

The sensor indicator lamp 140 includes, for example, a plurality of light emitting diodes that emit light in different colors. The sensor communication unit 150 transmits various signals output from the sensor control unit 190 to the static eliminator 200 via the relay cable CAL Further, the sensor communication unit 150 receives various types of information transmitted from the static eliminator 200 via the relay cable CA1 and gives the information to the sensor control unit 190.

The sensor power supply unit 160 receives and accumulates power supplied from the static eliminator 200 via the relay cable CAL Furthermore, the sensor power supply unit 160 supplies the power received from the static eliminator 200 or the accumulated power to each constituent element of the ion balance sensor 100.

The sensor control unit 190 includes a microcomputer, and generates various types of information and controls each of the constituent elements. Note that the sensor control unit 190 may include a central processing unit (CPU) and a memory instead of the microcomputer. The microcomputer or the memory of the sensor control unit 190 mainly stores a program configured to detect the ion balance, the ion current, the temperature, and the humidity of the target space 3, and to transmit and receive various types of information to and from the static eliminator 200. In the sensor control unit 190, a plurality of functional units are implemented as the microcomputer or the CPU executes the program stored in the sensor control unit 190.

The sensor control unit 190 includes, as the plurality of functional units, a balance information generation unit 191, an ion amount information generation unit 192, a temperature information generation unit 193, a humidity information generation unit 194, and an indicator lamp control unit 195. Note that some or all of the plurality of functional units may be implemented by hardware such as an electronic circuit.

The balance information generation unit 191 detects the ion balance in the target space 3 based on the signal output from the ion detection circuit 110B, and generates a signal indicating a detection result as an ion balance signal. In other words, the balance information generation unit 191 generates the ion balance signal based on a temporal change in the potential of the detection plate 110A. The generated ion balance signal is output from the sensor control unit 190. A specific example of a method for detecting ion balance by the balance information generation unit 191 will be described later.

The ion amount information generation unit 192 detects the ion current in the target space 3 based on the signal output from the ion detection circuit 110B, and generates a signal indicating a detection result as an ion current signal. In other words, the ion amount information generation unit 192 generates the ion current signal based on a temporal change in potential of the detection plate 110A. The generated ion current signal is output from the sensor control unit 190. A specific example of a method for detecting an ion current by the ion amount information generation unit 192 will be described later.

The temperature information generation unit 193 detects the temperature of the target space 3 based on the signal output from the temperature detection element 120, and generates a signal indicating a detection result as a temperature signal. The generated temperature signal is output from the sensor control unit 190. The humidity information generation unit 194 detects the humidity of the target space 3 based on the signal output from the humidity detection element 130, and generates a signal indicating a detection result as a humidity signal. The generated humidity signal is output from the sensor control unit 190.

The indicator lamp control unit 195 controls a light emission state of the sensor indicator lamp 140. Furthermore, for example, in a case where the ion balance and the ion current detected by the ion balance sensor 100 satisfy a predetermined allowable condition, the indicator lamp control unit 195 controls the sensor indicator lamp 140 to emit light in a specific color (for example, green). On the other hand, for example, in a case where the ion balance and the ion current detected by the ion balance sensor 100 do not satisfy the above-described allowable condition, the indicator lamp control unit 195 controls the sensor indicator lamp 140 to emit light in a specific other color (for example, red).

In the ion balance sensor 100 according to the present embodiment, the detection plate 110A and the ion detection circuit 110B are electrically connected inside the ion balance sensor 100 (inside a sensor housing 400 in FIG. 7 to be described later). In this case, a distance between the detection plate 110A and the ion detection circuit 110B can be made relatively short, and thus, the detection accuracy of the ion balance and the ion current in the ion detection circuit 110B are hardly affected by noise from the outside of the ion balance sensor 100.

Further, in the ion balance sensor 100, the ion detection circuit 110B and the sensor control unit 190 are electrically connected inside the ion balance sensor 100 (inside the sensor housing 400 in FIG. 7 to be described later). In this case, a distance between the ion detection circuit 110B and the sensor control unit 190 can be made relatively short, the signal transferred from the ion detection circuit 110B to the sensor control unit 190 is hardly affected by the noise from the outside of the ion balance sensor 100.

Furthermore, the ion detection circuit 110B includes an operational amplifier 111 (FIG. 5) regarding signal processing in the ion balance sensor 100 as will be described later. The operational amplifier 111 amplifies a weak signal (current) corresponding to the ion balance and ion current generated in the ion detection circuit 110B. Therefore, an amplified analog signal corresponding to the ion balance and ion current is provided from the ion detection circuit 110B to the sensor control unit 190.

Here, the sensor control unit 190 according to the present embodiment has an AD converter or a function of converting an analog signal into a digital signal. Therefore, in the sensor control unit 190, the amplified analog signal provided from the ion detection circuit 110B is converted into and output as a digital signal. As a result, the digital signal is transmitted and received between the sensor communication unit 150 and the static eliminator 200 via the relay cable CAL That is, the signal transmitted from the ion balance sensor 100 to the static eliminator 200 via the relay cable CA1 is the digital signal obtained by amplifying the current flowing from the detection plate 110A at least by the operational amplifier 111 included in the ion balance sensor 100.

The digital signal is less likely to be affected by noise than the analog signal. Therefore, the signal transmitted through the relay cable CA1 is hardly affected by the noise, and thus, it is unnecessary to use a cable having a small leakage current or a shielded cable as the relay cable CAL Therefore, a cable in which an external covering layer is made of general-purpose polyvinyl chloride can be used as the relay cable CA1 according to the present embodiment.

Note that a configuration is assumed in which the detection plate 110A and the ion detection circuit 110B are separately provided to be spaced apart from each other, and the detection plate 110A and the ion detection circuit 110B are connected by one cable. Alternatively, a configuration is assumed in which the ion detection circuit 110B and the sensor control unit 190 are separately provided to be spaced from each other, and the detection plate 110A and the ion detection circuit 110B are connected by one cable. In these cases, the one cable needs to transmit an analog signal between the detection plate 110A and the ion detection circuit 110B or between the ion detection circuit 110B and the sensor control unit 190. Therefore, as the one cable, it is necessary to use a cable excellent in noise resistance in order to reduce deterioration in the detection accuracy of the ion balance sensor 100.

3. Basic Configuration of Static Eliminator 200

Figure 3:
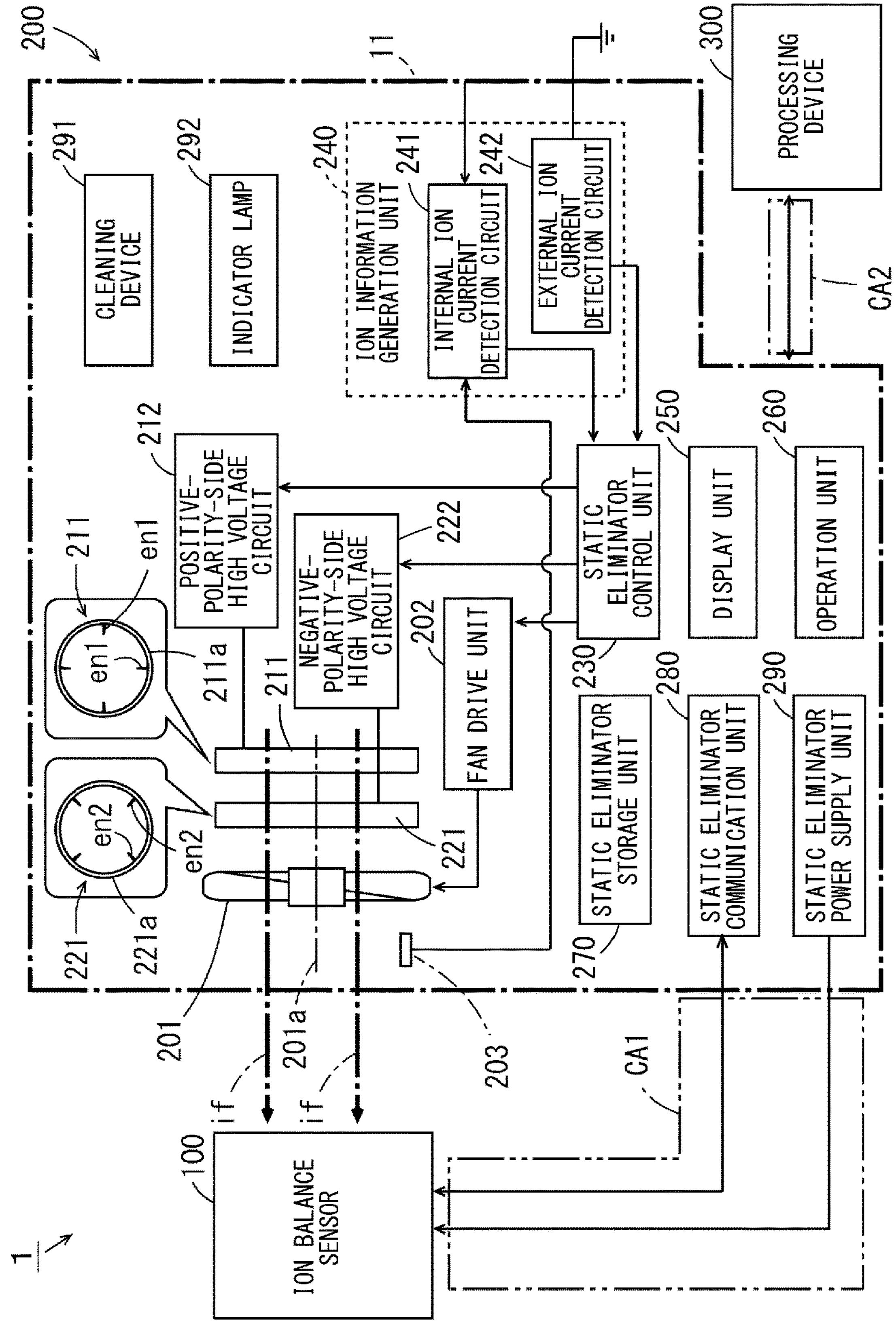
FIG. 3 is a block diagram of the static elimination system for describing a basic configuration of a static eliminator of FIG. 1.

FIG. 3 is a block diagram of the static elimination system 1 for describing a basic configuration of the static eliminator 200 of FIG. 1. As illustrated in FIG. 3, the static eliminator 200 includes the fan 201, a fan drive unit 202, a sensing electrode 203, a positive ion generation unit 211, a positive-polarity-side high voltage circuit 212, a negative ion generation unit 221, a negative-polarity-side high voltage circuit 222, a static eliminator control unit 230, and an ion information generation unit 240. These constituent elements are accommodated in the static eliminator housing 11 of FIG. 1 as indicated by a bold dashed-dotted line in FIG. 3.

In FIG. 3, schematic front views of the positive ion generation unit 211 and the negative ion generation unit 221 are illustrated in balloons. The positive ion generation unit 211 includes an annular member 211*a* and a plurality of (four in this example) electrode needles en1. The plurality of electrode needles en1 are provided at equal intervals on an inner peripheral portion of the annular member 211*a* so as to extend toward the center of the annular member 211*a*. Similarly to the positive ion generation unit 211, the negative ion generation unit 221 includes an annular member 221*a* and a plurality of electrode needles en2. The plurality of electrode needles en2 are provided at equal intervals on the inner peripheral portion of the annular member 221*a* so as to extend toward the center of the annular member 221*a*.

The positive-polarity-side high voltage circuit 212 is connected to the positive ion generation unit 211. The positive-polarity-side high voltage circuit 212 includes a resistor and a booster circuit, and applies a high voltage to the plurality of electrode needles en1 of the positive ion generation unit 211 under the control of the static eliminator control unit 230. As a result, a corona discharge is generated thereby generating positive ions. The negative-polarity-side high voltage circuit 222 is connected to the negative ion generation unit 221. The negative-polarity-side high voltage circuit 222 includes a resistor and a booster circuit, and applies a high voltage to the plurality of electrode needles en2 of the negative ion generation unit 221 under the control of the static eliminator control unit 230. As a result, a corona discharge is generated thereby generating negative ions.

The fan 201 is provided inside the static eliminator housing 11 of FIG. 1 so as to face the air outlet 12 and to be rotatable about a predetermined rotating shaft 201*a*. The fan drive unit 202 includes, for example, a motor, and rotates the fan 201 about the rotating shaft 201*a* under the control of the static eliminator control unit 230.

The fan 201, the negative ion generation unit 221, and the positive ion generation unit 211 are arranged side by side in this order in a direction of the rotating shaft 201*a* of the fan 201 from the air outlet 12 of FIG. 1. The annular members 211*a* and 221*a* of the positive ion generation unit 211 and the negative ion generation unit 221 have centers located on the rotating shaft 201*a* of the fan 201.

As the positive-polarity-side high voltage circuit 212 and the negative-polarity-side high voltage circuit 222 are operated, the positive ion generation unit 211 and the negative ion generation unit 221 generate positive ions and negative ions, respectively. In this state, the fan 201 rotates. As a result, the static elimination gas containing the positive ions and negative ions flows to the outside of the static eliminator 200 through the air outlet 12 of the static eliminator housing 11. In FIG. 3, the flow of the static elimination gas flowing from the air outlet 12 of the static eliminator housing 11 to the outside of the static eliminator 200 is indicated by the plurality of thick dashed-dotted arrows if similarly to the example of FIG. 1. The sensing electrode 203 is arranged on a flow path of the static elimination gas sent by the fan 201. The ion current caused by the static elimination gas flows through the sensing electrode 203.

The ion information generation unit 240 detects the overall ion balance between the positive ions and the negative ions generated in the static eliminator 200 as ion information. The ion information includes ion balance of the static elimination gas flowing through the air outlet 12 of the static eliminator 200, which is different from the ion balance in the target space 3 detected by the ion balance sensor 100. Further, the ion information includes ion balance in the target space 3 and the space surrounding the static eliminator 200. Therefore, the ion information is generated based on detection results, for example, obtained by detecting the ion balance of the static elimination gas flowing in the vicinity of the fan 201 and detecting the ion balance in the target space 3 and the space surrounding the static eliminator 200.

More specifically, the ion information generation unit 240 includes an internal ion current detection circuit 241 and an external ion current detection circuit 242 as illustrated in a dotted frame in FIG. 3. The internal ion current detection circuit 241 is connected to the sensing electrode 203 and is connected to the static eliminator housing 11. The internal ion current detection circuit 241 detects an ion current flowing through the sensing electrode 203 and an ion current flowing on a surface of the static eliminator housing 11 as internal ion currents. The external ion current detection circuit 242 is connected to a ground electrode maintained at a ground potential. The external ion current detection circuit 242 detects, as an external ion current, an ion current (return current) returning from the target space 3 to the static eliminator 200 via a ground. As the external ion current is detected, the ion balance of the static elimination gas sent out from the static eliminator housing 11 toward the target space 3 and the space surrounding the static eliminator 200 is detected. In the following description, the ion balance detected based on the external ion current is referred to as return ion balance in order to facilitate understanding that the ion balance is detected based on the return current. As each of the internal ion currents and the external ion current is detected, the amount of ions generated by each of the positive ion generation unit 211 and the negative ion generation unit 221 is measured.

The static eliminator control unit 230 includes a CPU and a memory or a microcomputer. The static eliminator control unit 230 controls the fan drive unit 202 such that the fan 201 rotates at a predetermined rotational speed at the time of static elimination of the plurality of objects 9 by the static eliminator 200. Note that the static eliminator 200 is configured to be operable in an eco-mode in the present embodiment. In the eco-mode, the above-described static elimination is performed in a state where power consumption is as small as possible. For example, in the eco-mode, the static elimination is performed in a state where an air volume of the fan 201 is the smallest (Air volume level "1" to be described later).

Further, in a case where the ion balance sensor 100 is connected to the static eliminator 200, the static eliminator control unit 230 controls the positive-polarity-side high voltage circuit 212 and the negative-polarity-side high voltage circuit 222 such that the ion balance detected by the ion balance sensor 100 approaches zero. On the other hand, in a case where the ion balance sensor 100 is not connected to the static eliminator 200, the static eliminator control unit 230 controls the positive-polarity-side high voltage circuit 212 and the negative-polarity-side high voltage circuit 222 such that the ion balance (for example, return ion balance) approaches zero based on the ion information generated by the ion information generation unit 240.

The operation of the static eliminator control unit 230 in the case where the ion balance sensor 100 is not connected to the static eliminator 200 will be described more specifically. In the present embodiment, the static eliminator control unit 230 controls the positive-polarity-side high voltage circuit 212 and the negative-polarity-side high voltage circuit 222 based on the return ion balance detected by the external ion current detection circuit 242 in the case where the ion balance sensor 100 is not connected to the static eliminator 200. The return ion balance can be said to be the overall ion balance of positive ions and negative ions sent out from the inside to the outside of the static eliminator 200 among positive ions and negative ions generated in the static eliminator 200. In the case where the ion balance sensor 100 is not connected to the static eliminator 200 in this manner, the static eliminator control unit 230 controls the positive-polarity-side high voltage circuit 212 and the negative-polarity-side high voltage circuit 222 such that the return ion balance becomes zero.

Further, in the static elimination system 1 according to the present embodiment, a plurality of types of events are defined in the static eliminator 200 in advance. The static eliminator control unit 230 detects occurrence of the plurality of types of events in the static eliminator 200 based on various physical quantities and the like detected by the ion balance sensor 100. The plurality of types of events include turning on or off of power of the static eliminator 200, a start or an end of static elimination, an operation of a cleaning device 291 to be described later, and the like.

In addition to the above constituent elements (201, 202, 211, 212, 221, 222, 230, and 240), the static eliminator 200 further includes a display unit 250, an operation unit 260, a static eliminator storage unit 270, a static eliminator communication unit 280, a static eliminator power supply unit 290, the cleaning device 291, and an indicator lamp 292. The display unit 250, the operation unit 260, and the indicator lamp 292 are attached to a part of the static eliminator housing 11. The static eliminator storage unit 270, the static eliminator communication unit 280, the static eliminator power supply unit 290, and the cleaning device 291 are accommodated in the static eliminator housing 11 of FIG. 1.

Figure 4:
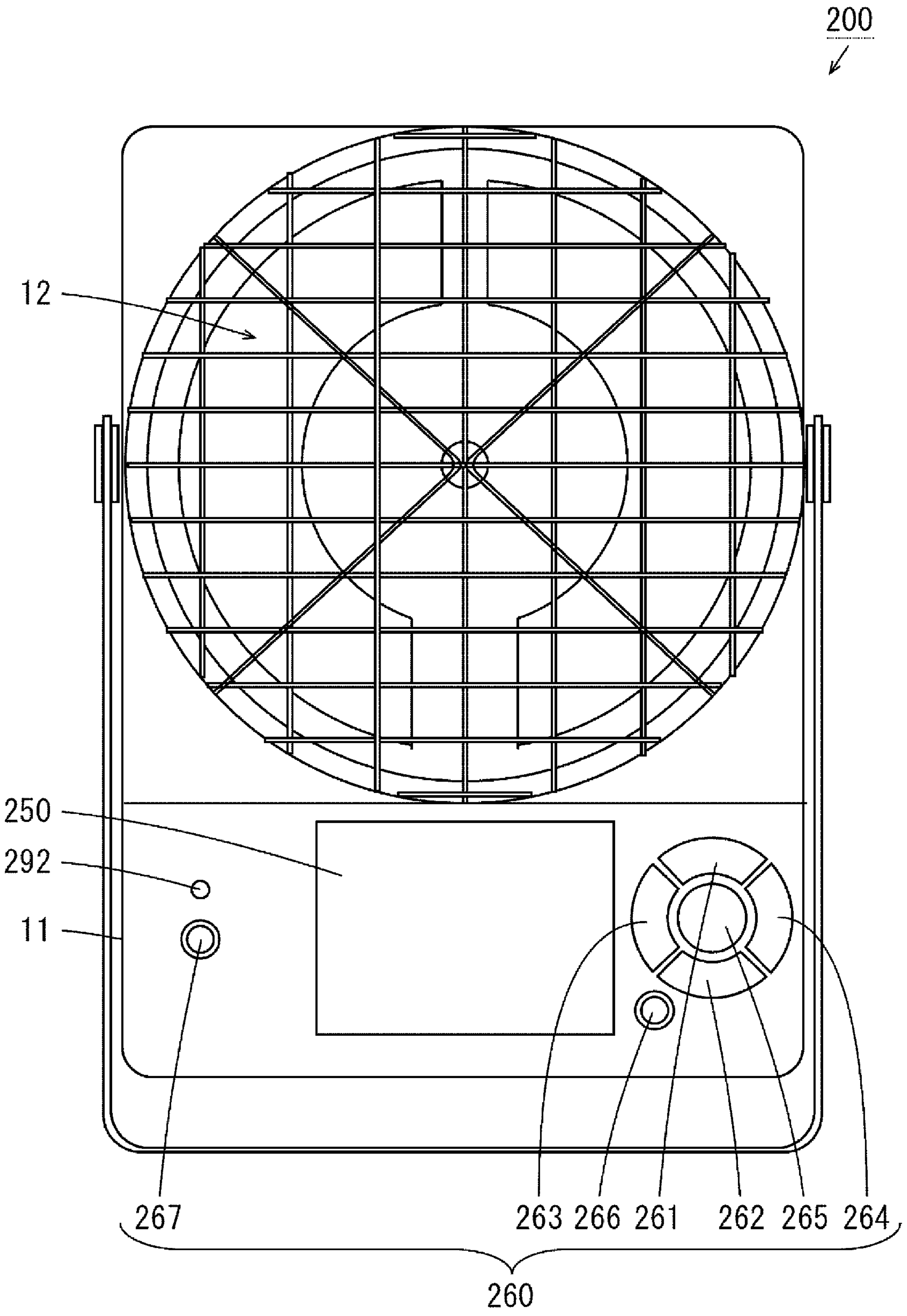
FIG. 4 is a view illustrating an example of arrangement of a display unit, an operation unit, and an indicator lamp.

FIG. 4 is a view illustrating an example of arrangement of the display unit 250, the operation unit 260, and the indicator lamp 292. As illustrated in FIG. 4, the display unit 250 is arranged in a central area in a lower portion of a front surface of the static eliminator housing 11. The display unit 250 is configured using a liquid crystal display (LCD) panel or an organic electroluminescence (EL) panel. The display unit 250 displays various types of setting information, alarms, and the like of the static eliminator 200 under the control of the static eliminator control unit 230.

The operation unit 260 includes a plurality of operation buttons and is provided on the static eliminator housing 11 so as to be adjacent to the display unit 250. Specifically, the operation unit 260 includes an up button 261, a down button 262, a left button 263, a right button 264, an OK button 265, a cancel button 266, and a power button 267. The up button 261, the down button 262, the left button 263, the right button 264, the OK button 265, and the cancel button 266 are arranged on one side (right in this example) of the display unit 250. The power button 267 is arranged on the other side (left in this example) of the display unit 250. Further, the static eliminator housing 11 is provided with a main power switch (not illustrated) for turning on and off the static eliminator 200.

As described later, the static eliminator 200 can clean the electrode needles en1 and en2 by the cleaning device 291. The OK button 265 receives not only an instruction corresponding to a content displayed on the display unit 250 but also a cleaning start instruction. A user can issue the instruction corresponding to the content displayed on the display unit 250 to the static eliminator 200 by pressing the OK button 265 short, and issue the cleaning start instruction by pressing the OK button 265 for two seconds or longer. In the static eliminator 200, static elimination is not executed during execution of cleaning. Therefore, since the long press of the OK button 265 is assigned to the cleaning start instruction, it is possible to prevent provision of a period in which static elimination is not executed due to an erroneous operation of the operation unit 260 by the user.

The power button 267 receives a static elimination start instruction and a static elimination stop instruction. That is, the user can instruct the static eliminator 200 to start and stop the static elimination by pressing the power button 267. The static eliminator 200 starts the static elimination when the power button 267 is pressed in a state where the static eliminator 200 stops the static elimination, and the static eliminator 200 stops the static elimination when the power button 267 is pressed in a state where the static eliminator 200 is executing the static elimination.

Furthermore, the user can perform various settings on the static eliminator 200 by operating the operation unit 260, and can display a detection result of the ion balance obtained by the ion balance sensor 100 on the display unit 250. Operation examples of other buttons such as the up button 261, the down button 262, the left button 263, the right button 264, the OK button 265, and the cancel button 266 will be described later together with display examples of the display unit 250.

Further, the static eliminator 200 may be configured to be operable in a lock mode in the present embodiment. In the lock mode, a user who can change various operation conditions is limited to a specific user. Therefore, input of a password is requested at the time of changing various operation conditions set in the static eliminator 200. The user can input the password to the static eliminator 200 by operating the operation unit 260. When the password is input, the lock is temporarily released, and settings of various operation conditions can be changed. In this manner, only the specific user who knows the password can change various operation conditions by requesting the input of the password.

The static eliminator communication unit 280 in FIG. 3 receives signals of various types of information transmitted from the sensor communication unit 150 (FIG. 2) of the ion balance sensor 100 via the relay cable CA1, and gives the signals to the static eliminator control unit 230.

Meanwhile, the ion balance sensor 100 is arranged in the target space 3, and thus, is located in the vicinity of the object 9. Therefore, the ion balance detected by the ion balance sensor 100 is ion balance of a space in the vicinity of the object 9. On the other hand, the return ion balance detected by the external ion current detection circuit 242 can be said to be the overall ion balance of the positive ions and negative ions sent out from the inside to the outside of the static eliminator 200 among the positive ions and negative ions generated in the static eliminator 200 as described above.

The ion balance is likely to be biased depending on a space. Therefore, the ion balance is often biased when only the space in the vicinity of the object 9 is focused even in a state where the return ion balance detected by the external ion current detection circuit 242 is close to zero. Therefore, it is possible to obtain a higher static elimination effect for the object 9 when the positive-polarity-side high voltage circuit 212 and the negative-polarity-side high voltage circuit 222 are controlled based on the ion balance detected by the ion balance sensor 100.

Therefore, in the present embodiment, the static eliminator control unit 230 controls the positive-polarity-side high voltage circuit 212 and the negative-polarity-side high voltage circuit 222 based on the signals given to the static eliminator communication unit 280, that is, the ion balance detected by the ion balance sensor 100, in the case where the ion balance sensor 100 is connected to the static eliminator 200 as described above. That is, the static eliminator control unit 230 preferentially uses the ion balance detected by the ion balance sensor 100 for control in a state where the return ion balance can be detected by the external ion current detection circuit 242 and the ion balance in the target space 3 can be detected by the ion balance sensor 100.

According to such a configuration, the user can improve the accuracy of static elimination of the static eliminator 200 by connecting the ion balance sensor 100 to the static eliminator 200.

Note that the ion balance sensor 100 includes the operational amplifier 111 (FIG. 5) that amplifies an input and the sensor control unit 190 (FIG. 5) that processes an output from the operational amplifier 111 and outputs a digital signal as will be described later. Therefore, a relay apparatus that converts a signal format is unnecessary between the ion balance sensor 100 and the static eliminator 200 in order for the static eliminator control unit 230 of the static eliminator 200 to perform control based on a signal of the ion balance (ion balance signal) detected by the ion balance sensor 100.

The static eliminator storage unit 270 includes a memory or a hard disk. When the static eliminator communication unit 280 receives the ion balance signal from the ion balance sensor 100, the static eliminator control unit 230 stores the ion balance in the target space 3 in the static eliminator storage unit 270 together with time period information. At this time, in addition to the storage operation, the static eliminator control unit 230 controls the positive-polarity-side high voltage circuit 212 and the negative-polarity-side high voltage circuit 222 based on the received ion balance signal such that the ion balance in the target space 3 approaches zero as described above.

Further, when the static eliminator communication unit 280 receives the ion current signal from the ion balance sensor 100, the static eliminator control unit 230 stores the ion current in the target space 3 in the static eliminator storage unit 270 together with time period information. At this time, in addition to the storage operation described above, the static eliminator control unit 230 may cause the display unit 250 to display a message indicating that the installation state of the static eliminator 200 is not appropriate in a case where a received value of the ion current is equal to or less than the ion current threshold.

Furthermore, when the static eliminator communication unit 280 receives the temperature signal and the humidity signal from the ion balance sensor 100, the static eliminator control unit 230 causes the static eliminator storage unit 270 to store the temperature and the humidity of the target space 3 together with time period information. As a result, it is possible to manage static elimination states of the plurality of objects 9 based on various types of information regarding the environment of the target space 3 stored in the static eliminator storage unit 270.

Further, in a case where any of the plurality of types of events occurs in the static eliminator 200, the static eliminator control unit 230 detects the occurrence of the event and stores a content, an occurrence time, and the like of the event in the static eliminator storage unit 270. Note that the plurality of types of events are defined by being classified to belong to, for example, any of an error event, an alarm event, and a notification event.

The error event is an event indicating that a situation in which it is difficult to appropriately continue the static elimination has occurred. Therefore, in a case where the error event is detected, the static elimination is automatically stopped. The alarm event is an event for prompting the user for confirmation in a case where the static eliminator 200 exhibits a behavior different from a behavior assumed in advance, and is detected based on various thresholds and the like preset as fixed values in the static eliminator 200. The notification event is an event for notifying the user in a case where the static eliminator 200 exhibits a behavior different from a behavior assumed by the user, and is detected based on various thresholds and the like set in the static eliminator 200 by the user.

The static eliminator power supply unit 290 receives power supplied from a commercial power supply through a power supply cable (not illustrated), an AC adapter, and the like and supplies a part of the received power to other constituent elements provided in the static eliminator 200. Further, the static eliminator power supply unit 290 supplies the rest of the received power to the sensor power supply unit 160 (FIG. 2) of the ion balance sensor 100 through the relay cable CAL Power from a DC power supply or power converted appropriately by the AC adapter is supplied to the commercial power supply in the static eliminator 200 and the sensor power supply unit 160.

The cleaning device 291 is configured to clean the plurality of electrode needles en1 and en2 of the positive ion generation unit 211 and the negative ion generation unit 221 with a brush, for example, and operates under the control of the static eliminator control unit 230. The indicator lamp 292 includes one or a plurality of light emitting diodes, and emits light, is turned off, or blinks under the control of the static eliminator control unit 230. The indicator lamp 292 is arranged above the power button 267 of the operation unit 260 in the static eliminator housing 11 (see FIG. 4).

Note that the cleaning device 291 and the indicator lamp 292 are not essential constituent elements of the invention. Therefore, the static eliminator 200 does not necessarily include the cleaning device 291 and the indicator lamp 292.

4. Methods for Detecting Ion Balance and Ion Current

Figure 5:
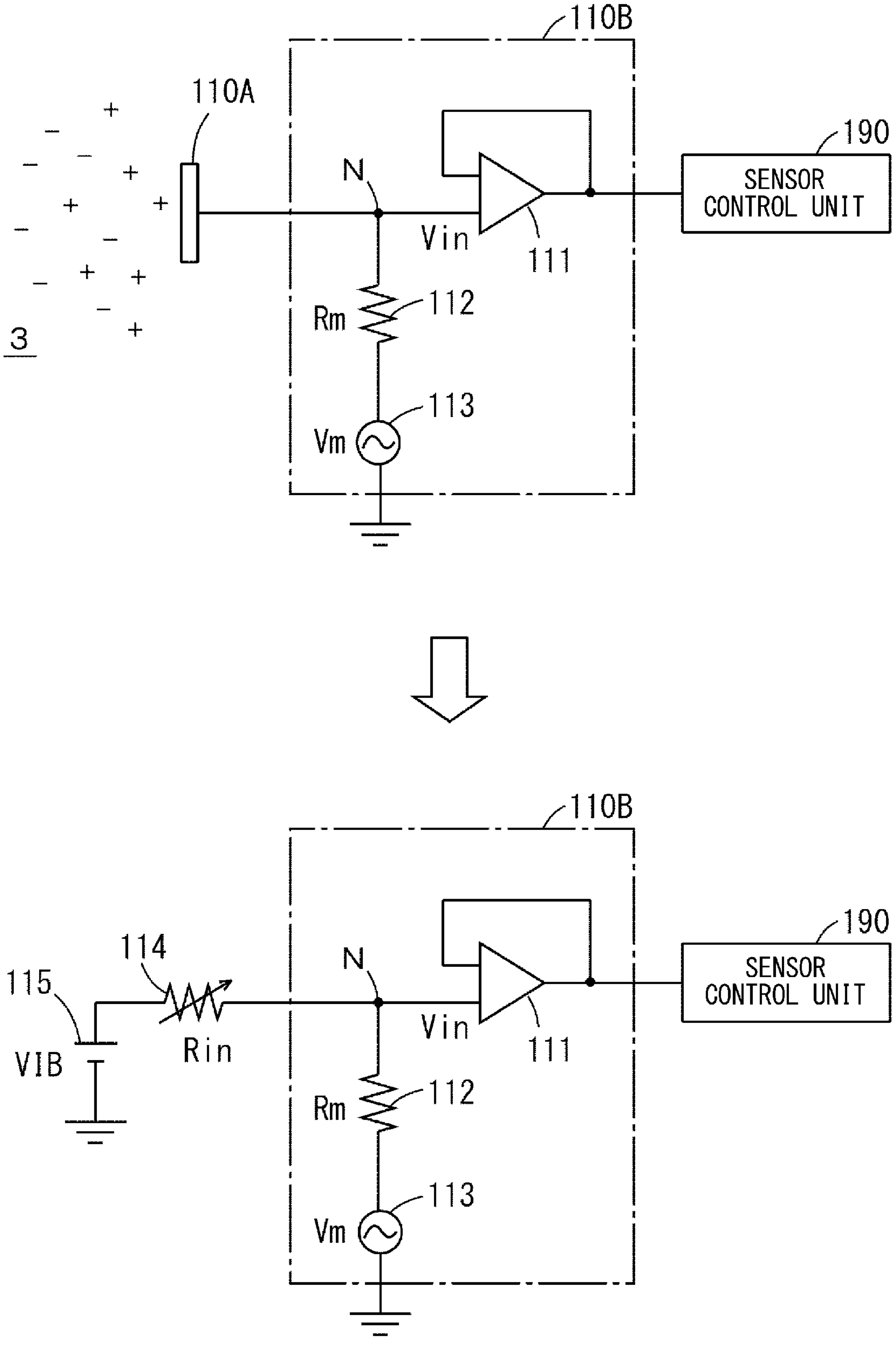
FIG. 5 is a view for describing methods for detecting ion balance and an ion current by the ion balance sensor of FIG. 1.
Figure 6:
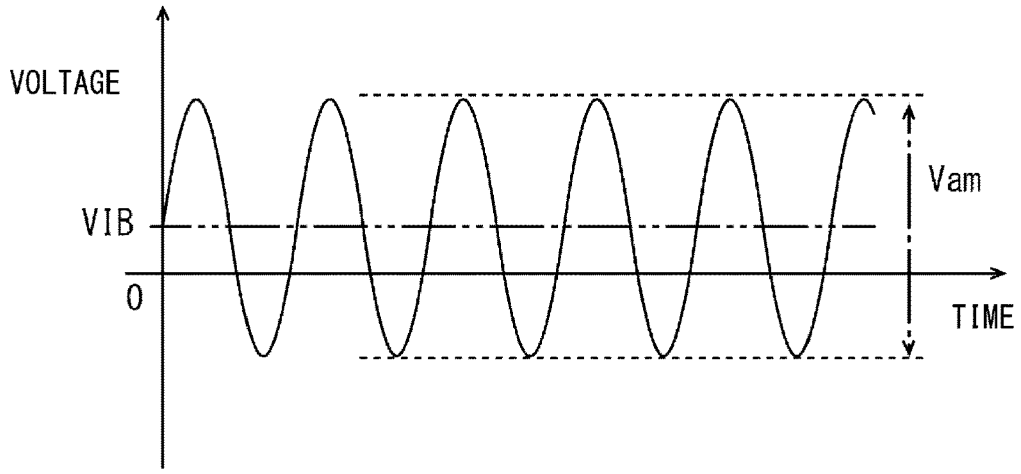
FIG. 6 is a view for describing the methods for detecting ion balance and an ion current by the ion balance sensor of FIG. 1.

Here, specific examples of methods for detecting ion balance and an ion current in the target space 3 will be described. FIGS. 5 and 6 are views for describing the methods for detecting ion balance and an ion current by the ion balance sensor 100 of FIG. 1. A circuit diagram schematically illustrating the detection plate 110A and the ion detection circuit 110B is illustrated in the upper part of FIG. 5. The ion detection circuit 110B includes the operational amplifier 111, a fixed resistor 112, and a modulation voltage source 113. The operational amplifier 111 is used as a buffer circuit, and a non-inverting input terminal of the operational amplifier 111 is electrically connected to the detection plate 110A. Further, an output terminal of the operational amplifier 111 is connected to an inverting input terminal of the operational amplifier 111 and is connected to the sensor control unit 190.

The modulation voltage source 113 generates an alternating-current voltage as a modulation voltage having periodicity. The modulation voltage source 113 is electrically connected to a node N between the detection plate 110A and a non-inverting input terminal of the operational amplifier 111 via the fixed resistor 112. Note that a node N may be located on the detection plate 110A. In this case, the modulation voltage source 113 is electrically connected to the detection plate 110A via the fixed resistor 112.

As described above, the detection plate 110A is provided so as to be exposed in the space (target space 3 in this example) surrounding the ion balance sensor 100. Further, the static elimination gas containing positive ions and negative ions flows from the static eliminator 200 into the target space 3 of this example.

As illustrated in the lower part of FIG. 5, a relationship between the ion balance and ion current in the target space 3 and a potential of the detection plate 110A can be modeled into a circuit configuration in which a virtual voltage source 115 is connected to the node N via a virtual variable resistor 114, for example. In the modeled circuit configuration, a resistance value of the virtual variable resistor 114 corresponds to the ion current in the target space 3. The resistance value of the variable resistor 114 is larger as the ion current in the target space 3 is smaller, and is smaller as the ion current in the target space 3 is larger.

Further, in the modeled circuit configuration, a voltage of the virtual voltage source 115 corresponds to the ion balance in the target space 3. The voltage of the voltage source 115 more greatly deviates from zero as the degree of a bias of the ion balance in the target space 3 increases, and approaches zero as the degree of the bias of the ion balance in the target space 3 decreases.

When considering the circuit configuration modeled as described above, a potential of the node N can be represented by the sum of voltages of the modulation voltage source 113 and the virtual voltage source 115 divided by the fixed resistor 112 and the virtual variable resistor 114. Specifically, when the potential of the node N is Vin, the resistance value of the variable resistor 114 is Rin, the voltage of the virtual voltage source 115 is VIB, a resistance value of the fixed resistor 112 is Rm, and the voltage of the modulation voltage source 113 is Vm, the potential of the node N can be expressed by the following Formula (1).

$$Vin=[\{Rin/(Rm+Rin)\}\times Vm]+[\{Rm/(Rm+Rin)\}\times VIB] \quad (1)$$

In the above Formula (1), [{Rin/(Rm+Rin)}×Vm] represents a divided voltage component of the modulation voltage source 113, and [{Rm/(Rm+Rin)}×VIB] represents a divided voltage component of the voltage source 115.

As described above, the potential of the node N includes the divided voltage component of the modulation voltage source 113. Therefore, the degree of modulation of the divided voltage component of the modulation voltage source 113, that is, a magnitude of an amplitude per cycle changes according to the resistance value of the virtual variable resistor 114. For example, when the resistance value of the virtual variable resistor 114 increases due to the small ion current in the target space 3, the divided voltage component of the modulation voltage source 113 increases (fluctuates more). On the other hand, when the resistance value of the virtual variable resistor 114 decreases due to the large ion current in the target space 3, the divided voltage component of the modulation voltage source 113 decreases (fluctuates less). On the other hand, the divided voltage component of the voltage source 115 does not contribute to the modulation of the potential of the node N since the voltage of the virtual voltage source 115 does not periodically fluctuate.

FIG. 6 illustrates an example of a voltage waveform of a signal output from the operational amplifier 111 of FIG. 5. In FIG. 6, the vertical axis represents a voltage, and the horizontal axis represents time. Further, the voltage waveform of the signal output from the operational amplifier 111 of FIG. 5 is indicated by a solid line. The voltage waveform in FIG. 6 corresponds to the potential at the node N in FIG. 5. Note that it is assumed in the example of FIG. 6 that a static elimination gas containing a constant amount of positive ions and negative ions flows to the target space 3 at a constant flow rate, and the ion balance in the target space 3 is kept constant.

For the above-described reason, the potential of the node N fluctuates depending on the resistance value of the virtual variable resistor 114. Therefore, the ion amount information generation unit 192 in FIG. 2 detects a magnitude of an amplitude of the voltage waveform of the signal (voltage signal) output from the operational amplifier 111 in FIG. 5 or a value corresponding thereto as the ion current in the target space 3 as indicated by a dashed dotted arrow Vam in FIG. 6. Furthermore, the balance information generation unit 191 in FIG. 2 detects a value of a fluctuation center of the voltage waveform of the signal (voltage signal) output from the operational amplifier 111 in FIG. 5 or a value corresponding thereto as the ion balance in the target space 3 as indicated by reference sign VIB on the vertical axis in FIG. 6.

The ion balance sensor 100 detects the ion balance in the target space 3 according to the above detection method. In this case, the ion balance in the target space 3 can be detected within an error range of ±1.0 V with respect to actual ion balance in the target space 3. Note that it is preferable to appropriately perform ion balance calibration, which will be described later, at the time of detecting the ion balance by the ion balance sensor 100.

In the above detection methods, it is preferable to obtain a sampling cycle and a sampling period of the voltage waveform for detecting the ion balance and the ion current by an experiment, a simulation, or the like so as to obtain a more appropriate detection result. Further, in the above detection methods, it is preferable to obtain a cycle and an amplitude of a modulation voltage that is to be generated from the modulation voltage source 113 by an experiment, a simulation, and the like so as to obtain a more appropriate detection result.

Note that, in a case where a low-impedance member having a predetermined potential (a wire or the like connected to another voltage source) comes into contact with the detection plate 110A arranged in the target space 3, the output of the operational amplifier 111 is held at a constant value, and the amplitude of the voltage waveform becomes zero. Therefore, when the amplitude of the voltage waveform is zero, the indicator lamp control unit 195 may determine that the ion current does not satisfy the predetermined allowable condition, and control the sensor indicator lamp 140 to emit light in the specific other color (for example, red).

5. Structure of Ion Balance Sensor 100

Figure 7:
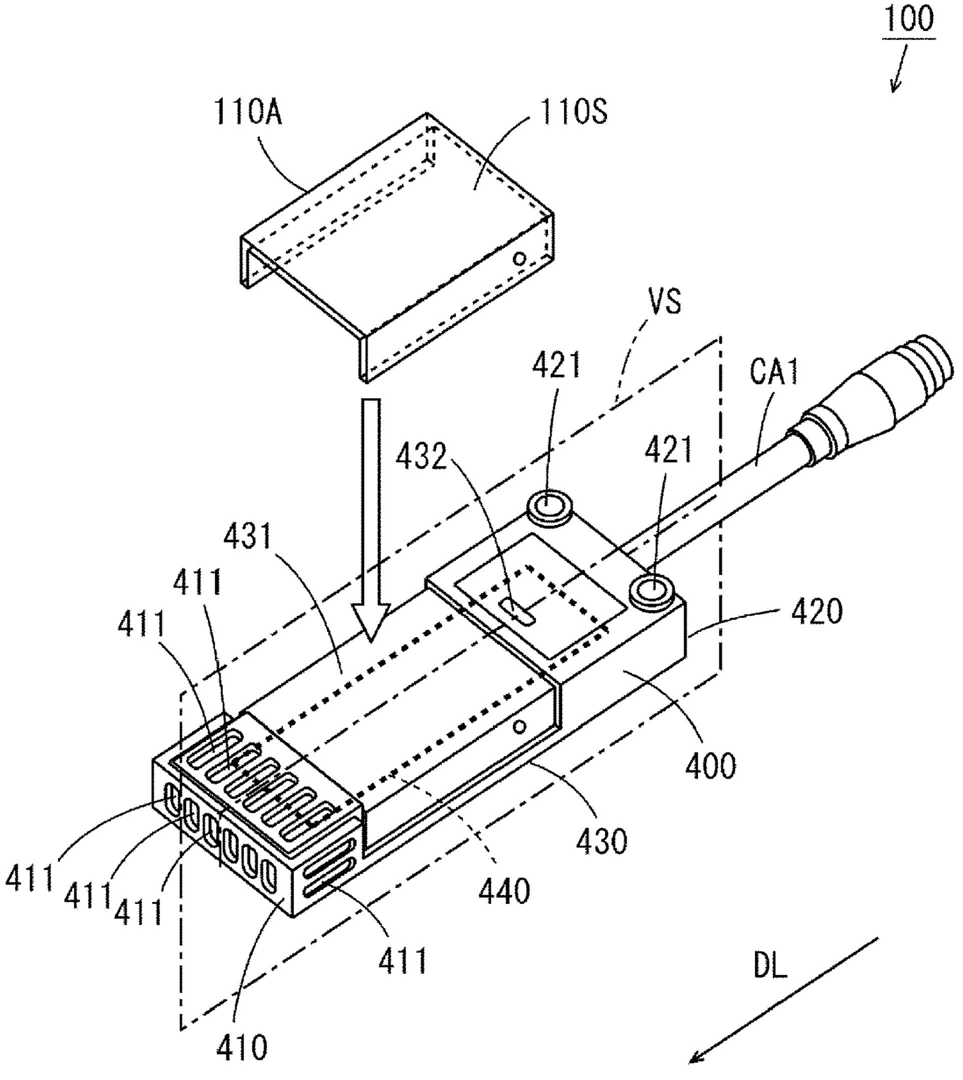
FIG. 7 is an external perspective view of the ion balance sensor of FIG. 1.

FIG. 7 is an external perspective view of the ion balance sensor 100 of FIG. 1. As illustrated in FIG. 7, the ion balance sensor 100 includes the sensor housing 400 formed to extend in one direction. In the following description, a direction in which the sensor housing 400 extends is referred to as a housing longitudinal direction DL regarding the ion balance sensor 100.

The sensor housing 400 has a substantially rectangular parallelepiped box shape and has an internal space extending in the housing longitudinal direction DL. One circuit board 440 is accommodated in the internal space of the sensor housing 400. In FIG. 7, the circuit board 440 accommodated in the sensor housing 400 is indicated by a thick dotted line. One end portion of the sensor housing 400 in the housing longitudinal direction DL is referred to as a first end portion 410, and the other end portion thereof is referred to as a second end portion 420. Further, a central portion of the sensor housing 400 in the housing longitudinal direction DL is referred to as a housing central portion 430.

The relay cable CA1 is provided to extend from the second end portion 420 of the sensor housing 400. A plurality of (two in this example) attachment holes 421 configured to attach the sensor housing 400 to a holder 900 (FIG. 9), which will be described later, are formed in the second end portion 420. On the other hand, a plurality of through holes 411 for causing the internal space of the sensor housing 400 to communicate with the outside of the sensor housing 400 are formed in the first end portion 410 of the sensor housing 400.

A plate attachment portion 431 configured to attach the detection plate 110A is formed on a part of an outer peripheral surface of the housing central portion 430 of the sensor housing 400. The detection plate 110A is manufactured by, for example, folding a metal plate cut into a predetermined shape, and has a detection surface 110S configured to detect ion balance and an ion current. The detection plate 110A is attached to the plate attachment portion 431 of the sensor housing 400 as indicated by a white arrow in FIG. 7. In this state, the detection surface 110S of the detection plate 110A is exposed in the space surrounding the ion balance sensor 100. As a result, when the ion balance sensor 100 is arranged in the target space 3, positive ions and negative ions existing in the target space 3 easily touch the detection surface 110S. Therefore, the ion balance and the ion current in the target space 3 can be appropriately detected.

In the housing central portion 430 of the sensor housing 400, an indicator lamp opening 432 is formed at a position adjacent to the plate attachment portion 431 in the housing longitudinal direction DL. The indicator lamp opening 432 is formed to guide light generated from the sensor indicator lamp 140 mounted on the circuit board 440 in the sensor housing 400 to the outside of the sensor housing 400 as will be described later.

Figure 8:
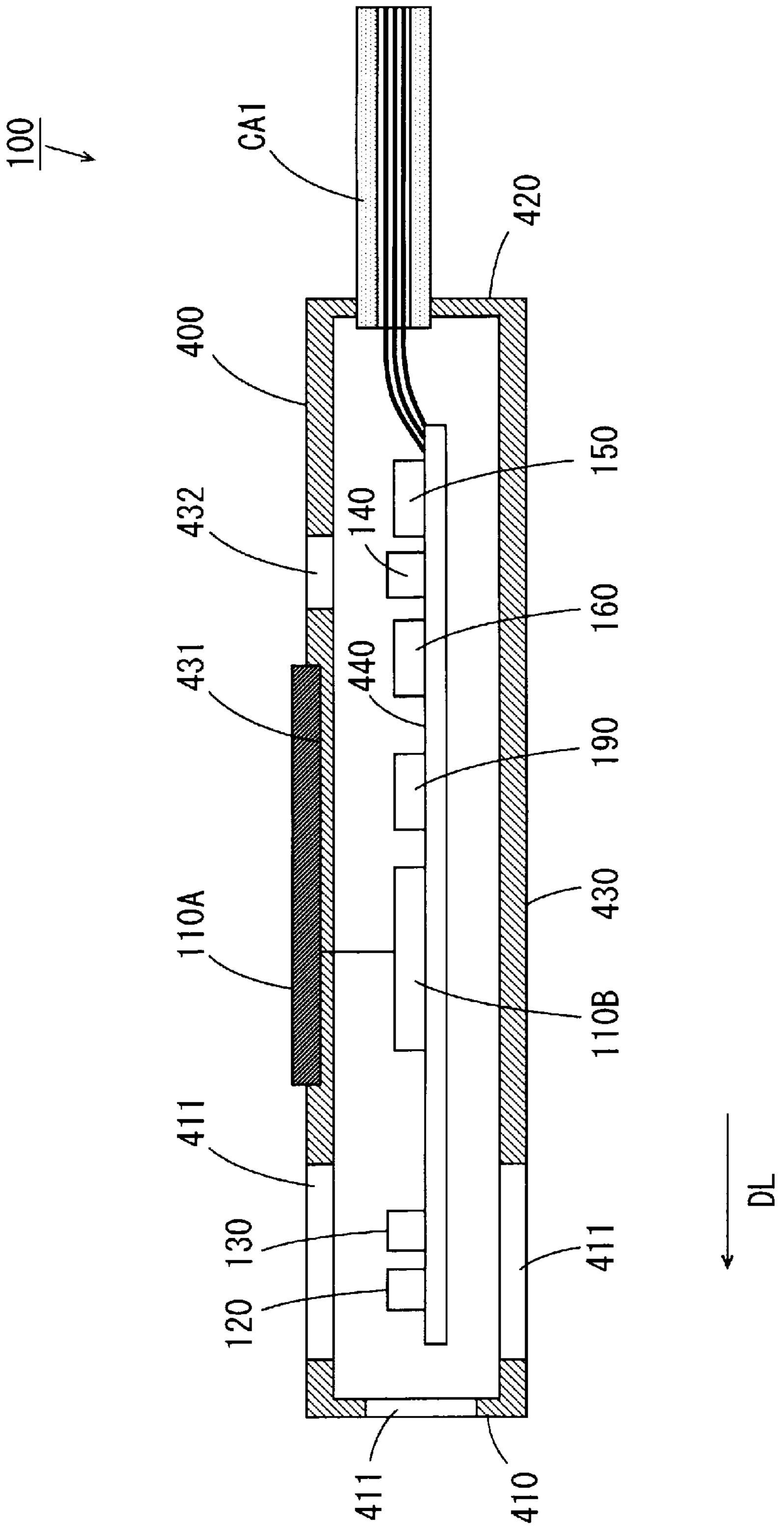
FIG. 8 is a schematic cross-sectional view illustrating a state where the ion balance sensor is cut along a virtual plane of FIG. 7.

FIG. 8 is a schematic cross-sectional view illustrating a state where the ion balance sensor 100 is cut along a virtual plane VS in FIG. 7. The virtual plane VS in FIG. 7 is a plane parallel to the housing longitudinal direction DL. As illustrated in FIG. 8, the circuit board 440 is provided to extend from the first end portion 410 to the second end portion 420 in the sensor housing 400. The ion detection circuit 110B, the temperature detection element 120, the humidity detection element 130, the sensor indicator lamp 140, the sensor communication unit 150, the sensor power supply unit 160, and the sensor control unit 190 in FIG. 2 are mounted on the circuit board 440.

Further, the relay cable CA1 is connected to the circuit board 440. As a result, various signals are transmitted and received between the sensor communication unit 150 (FIG. 2) of the ion balance sensor 100 and the static eliminator communication unit 280 (FIG. 3) of the static eliminator 200. Further, power is supplied from the static eliminator power supply unit 290 (FIG. 3) of the static eliminator 200 to the sensor power supply unit 160 (FIG. 2) of the ion balance sensor 100.

Furthermore, the detection plate 110A is connected to the circuit board 440. As a result, the ion balance and the ion current in the target space 3 are detected by the ion detection circuit 110B and the sensor control unit 190 mounted on the circuit board 440.

Here, the temperature detection element 120 and the humidity detection element 130 are mounted in the vicinity of one end portion of the circuit board 440 so as to be adjacent to the first end portion 410 of the sensor housing 400 in the housing longitudinal direction DL. On the other hand, each of the ion detection circuit 110B, the sensor indicator lamp 140, the sensor communication unit 150, the sensor power supply unit 160, and the sensor control unit 190 is mounted on the circuit board 440 so as to be spaced apart from the temperature detection element 120 and the humidity detection element 130 by a certain distance in the housing longitudinal direction DL.

The ion detection circuit 110B, the sensor indicator lamp 140, the sensor communication unit 150, the sensor power supply unit 160, and the sensor control unit 190 serve as heat sources during the operation of the ion balance sensor 100. Even in such a case, each of the temperature detection element 120 and the humidity detection element 130 is spaced apart from at least the heat sources by a certain distance in the sensor housing 400 according to the above configuration. Therefore, heat is prevented from being directly transferred from the heat sources during the operation of the ion balance sensor 100. As a result, the deterioration in the detection accuracy of the temperature and the humidity of the target space 3 is suppressed.

Further, the plurality of through holes 411 are formed in the first end portion 410 of the sensor housing 400 as described above. The plurality of through holes 411 function as vent holes for circulating an atmosphere between the internal space of the sensor housing 400 and the outside of the sensor housing 400. As a result, the heat generated from the heat sources in the sensor housing 400 is dissipated from the plurality of through holes 411 to the outside of the sensor housing 400 without staying in the sensor housing 400. Further, the atmosphere outside the sensor housing 400 easily comes into contact with the temperature detection element 120 and the humidity detection element 130 through the plurality of through holes 411. As a result, the detection accuracy of the temperature and the humidity of the target space 3 is improved.

6. Holder of Ion Balance Sensor 100

The sensor housing 400 is desirably fixed with a desired posture at a desired position in the target space 3 where static elimination is to be performed. Therefore, the ion balance sensor 100 according to the present embodiment may further include a holder for holding the sensor housing 400.

Figure 9:
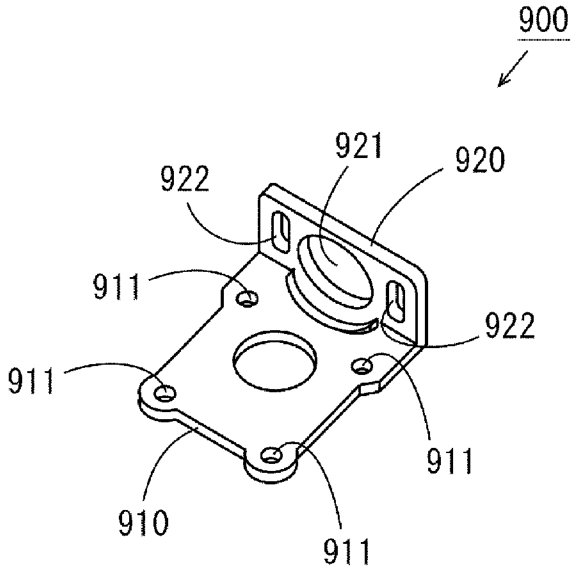
FIG. 9 is an external perspective view illustrating an example of a holder.

FIG. 9 is an external perspective view illustrating an example of the holder. The holder 900 in FIG. 9 is formed by, for example, folding a metal plate having high rigidity, and includes a sensor holding portion 910 and a fixing portion 920.

The sensor holding portion 910 and the fixing portion 920 are each formed in a flat plate shape, and are adjacent to each other in a state of being bent by 90°. A plurality of (four in this example) attachment holes 911 are formed in the sensor holding portion 910 to be spaced apart at equal intervals. The plurality of attachment holes 911 correspond to the two attachment holes 421 of the sensor housing 400. A cable opening 921 and a plurality of (two in this example) long holes 922 are formed in the fixing portion 920.

When the holder 900 is used, the sensor housing 400 is attached to the sensor holding portion 910. In this case, the relay cable CA1 of the ion balance sensor 100 is inserted into the cable opening 921 of the fixing portion 920. Further, the two attachment holes 421 (FIG. 7) of the sensor housing 400 are positioned on any two attachment holes 911 out of the four attachment holes 911 of the sensor holding portion 910. In this state, screws are inserted into the two attachment holes 421 of the sensor housing 400 and the two attachment holes 911 of the sensor holding portion 910 so that the sensor housing 400 and the sensor holding portion 910 are screwed. Furthermore, screws are inserted into the two long holes 922 of the fixing portion 920 so that the fixing portion 920 is screwed to another fixing tool such as a stand provided in or around the target space 3, for example.

Figure 10:
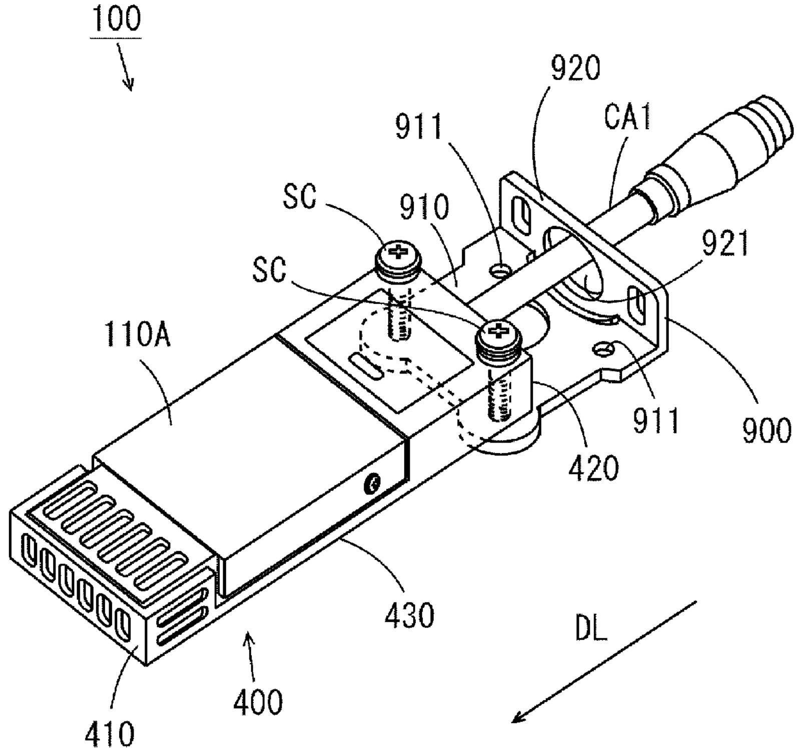
FIG. 10 is an external perspective view illustrating an example of a state where a sensor housing is attached to the holder.

FIG. 10 is an external perspective view illustrating an example of a state where the sensor housing 400 is attached to the holder 900. As illustrated in FIG. 10, the second end portion 420 of the sensor housing 400 is screwed to the sensor holding portion 910 using two screws SC. The holder 900 is configured not to come into contact with the first end portion 410 of the sensor housing 400 in this state.

According to the above configuration, the second end portion 420 of the sensor housing 400 is attached to the holder 900 made of metal, and thus, heat generated in the sensor housing 400 during the operation of the ion balance sensor 100 is transferred to the holder 900 through the second end portion 420. Further, the holder 900 does not come into contact with the first end portion 410 of the sensor housing 400 in the state where the sensor housing 400 is attached. As a result, heat is suppressed from being transferred from the holder 900 to the temperature detection element 120 and the humidity detection element 130 adjacent to the first end portion 410. As a result, the detection accuracy of the temperature and the humidity of the target space 3 by the temperature detection element 120 and the humidity detection element 130 is improved.

7. Display Examples of Display Unit

Figure 11:
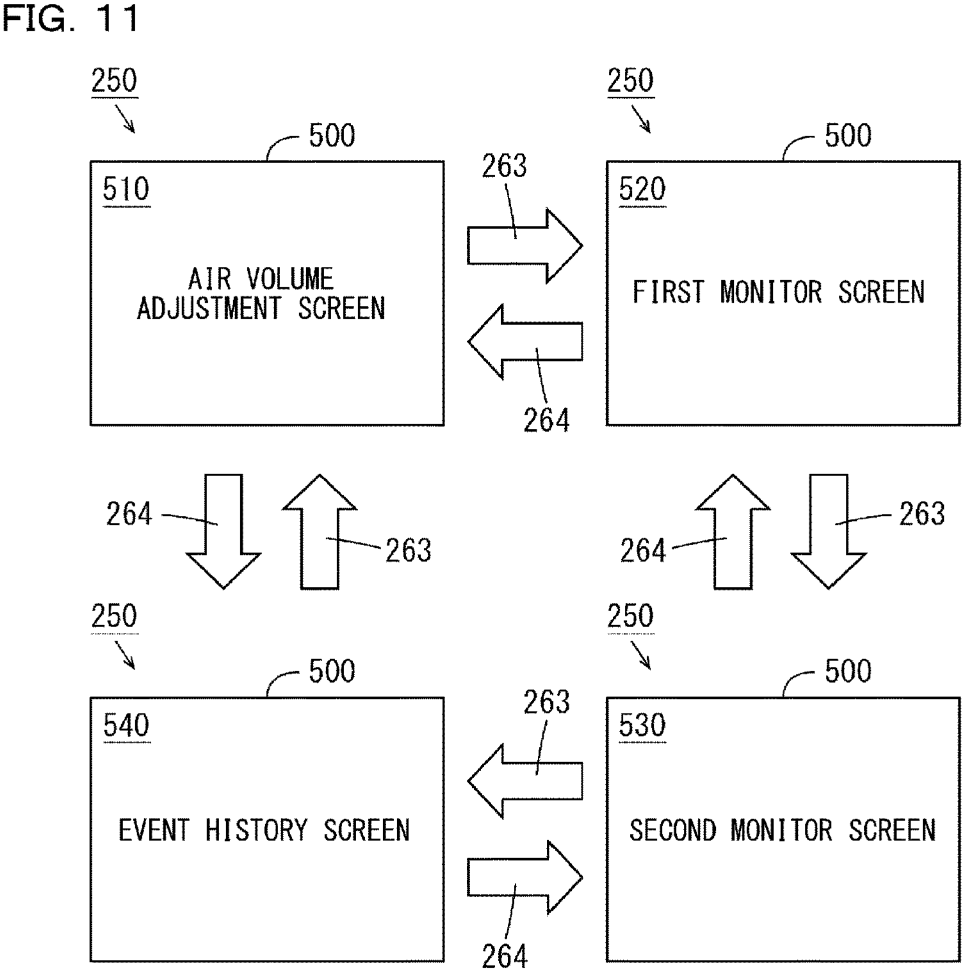
FIG. 11 is a view illustrating an example of a first layer screen.

When a main power switch (not illustrated) of the static eliminator housing 11 is turned on, the static eliminator 200 is activated. After the activation of the static eliminator 200, a predetermined activation screen is displayed on the display unit 250, and then, the first layer screen is displayed. FIG. 11 is a view illustrating an example of the first layer screen. As illustrated in FIG. 11, a first layer screen 500 includes a screen for monitoring a state of the static eliminator 200 or a screen for setting a setting item which is frequently changed, and includes a plurality of types (four types in this example) of screens. The four types of first layer screens 500 are referred to as an air volume adjustment screen 510, a first monitor screen 520, a second monitor screen 530, and an event history screen 540, respectively.

Any one of the above four types of first layer screens 500 is displayed on the display unit 250. Every time the left button 263 of the operation unit 260 in FIG. 4 is operated, the first layer screens 500 displayed on the display unit 250 are switched in a predetermined order. Further, every time the right button 264 of the operation unit 260 is operated, the first layer screens 500 displayed on the display unit 250 are switched in the reverse order from when the left button 263 is operated.

The second monitor screen 530 can be displayed on the display unit 250 only in a case where the ion balance sensor 100 is connected to the static eliminator 200. Therefore, in the case where the static eliminator 200 is connected to the ion balance sensor 100, when the left button 263 is operated in a state where the first monitor screen 520 is displayed on the display unit 250, the first monitor screen 520 is switched to the second monitor screen 530. Alternatively, when the right button 264 is operated in a state where the event history screen 540 is displayed on the display unit 250, the event history screen 540 is switched to the second monitor screen 530.

On the other hand, in a case where the static eliminator 200 is not connected to the ion balance sensor 100, when the left button 263 is operated in a state where the first monitor screen 520 is displayed on the display unit 250, the second monitor screen 530 is skipped, and the first monitor screen 520 is switched to the event history screen 540. Similarly, when the right button 264 is operated in a state where the event history screen 540 is displayed on the display unit 250, the second monitor screen 530 is skipped, and the event history screen 540 is switched to the first monitor screen 520.

In this manner, the number of screens displayed as the first layer screens 500 when the ion balance sensor 100 is not connected to the static eliminator 200 is smaller than the number of screens displayed as the first layer screens 500 when the ion balance sensor 100 is connected to the static eliminator 200. Therefore, it is possible to reduce operation procedures when a user displays a desired screen of the first layer screens 500. In this example, the second monitor screen 530 is not displayed when the ion balance sensor 100 is not connected to the static eliminator 200, and only the other screens of the first layer screens 500 are displayed. However, a configuration may be employed in which an alternative screen of the second monitor screen 530 is displayed as the first layer screen when the ion balance sensor 100 is not connected to the static eliminator 200.

The first layer screen 500 is a screen that is easily displayed by the user, and thus, includes a screen for displaying a static elimination state of the static eliminator 200. In practice, for the user, a frequency of work of changing various operation conditions of the static eliminator 200 is lower than a frequency of work of confirming the static elimination state of the static eliminator 200, and thus, a setting of the various operation conditions is performed on and after the second layer screen deeper than the first layer screen 500. In practice, however, an air volume among the various operation conditions of the static eliminator 200 is more frequently changed as compared with the other operation conditions. Therefore, in this example, the first layer screen 500 includes the air volume adjustment screen 510 for displaying an air volume, set at this time point as the static elimination state of the static eliminator 200, and receiving a change in the air volume. That is, the user can set the air volume in the various operation conditions of the static eliminator 200 on the first layer screen 500.

Figure 12:
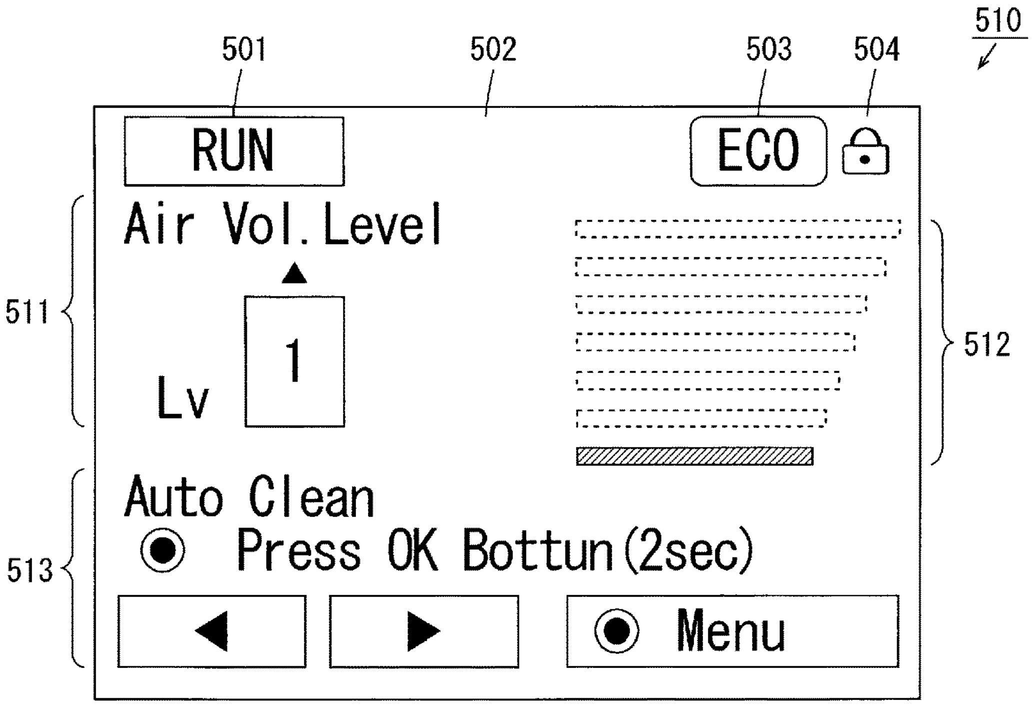
FIG. 12 is a view illustrating an example of an air volume adjustment screen.

FIG. 12 is a view illustrating an example of the air volume adjustment screen 510. As illustrated in FIG. 12, the air volume adjustment screen 510 displays a running state display area 501, an event display area 502, an eco-mode display area 503, and a lock mode display area 504. Further, an air volume value display area 511, an air volume gauge display area 512, and an explanation display area 513 are further displayed on the air volume adjustment screen 510. The running state display area 501, the event display area 502, the eco-mode display area 503, and the lock mode display area 504 are also displayed on the other first layer screens 500.

In the running state display area 501, the running state of the static eliminator 200 is displayed. A character string "RUN" is displayed during the execution of the static elimination, and a character string "STOP" is displayed during the stop of the static elimination. These displays are switched every time the power button 267 of the operation unit 260 in FIG. 4 is pressed short. In the event display area 502, when any event belonging to the error event, the alarm event, or the notification event is detected, an icon and a character string indicating a type of the event are displayed. Details of the event display area 502 will be described with the first monitor screen 520.

In the eco-mode display area 503, whether or not the static eliminator 200 is operating in the eco-mode is displayed. A character string "ECO" is displayed in a case where the static eliminator 200 is operating in the eco-mode, and nothing is displayed in a case where the static eliminator 200 is not operating in the eco-mode. In the lock mode display area 504, whether or not the static eliminator 200 is operating in the lock mode is displayed. A key mark is displayed in a case where the static eliminator 200 is operating in the lock mode, and nothing is displayed in a case where the static eliminator 200 is not operating in the lock mode. Further, the key mark is displayed to be light (grayed out) in a case where the password has been input in the lock mode, that is, in a case where the lock has been temporarily released.

A character string "Air Vol. Level" is displayed in the air volume value display area 511. Further, in the present embodiment, the air volume by the fan 201 is divided into seven levels of Air volume levels "1" to "7" based on the rotational speed of the fan 201. In the air volume value display area 511, a current air volume level is displayed numerically. Note that the static eliminator 200 is operating in the eco-mode in the example of FIG. 12. Therefore, the air volume level is "1" which is the lowest. When the air volume level is changed in this state, a confirmation message for canceling the eco-mode may be displayed on the air volume adjustment screen 510.

In the air volume gauge display area 512, a current air volume level is displayed using a gauge. In this example, the gauge includes seven bars extending laterally. The seven bars have lengths corresponding to Air volume levels “1” to “7”, respectively. Bars corresponding to the current air volume level and an air volume level equal to or lower than the current air volume level are displayed in color, and the other bars are displayed to be grayed out. The color may vary for each range of the air volume levels. For example, bars for Air volume levels “1” and “2” may be displayed in green, bars for Air volume levels “3” to “5” may be displayed in yellow, and bars for Air volume levels “6” and “7” may be displayed in red.

In the explanation display area 513, simple explanations of some buttons of the operation unit 260 are displayed. The example of FIG. 12 illustrates that the air volume adjustment screen 510 is switched to another first layer screen 500 by operating the left button 263 or the right button 264. Further, it is illustrated that the first layer screen 500 transitions to a menu screen (second layer screen) for performing various settings when the OK button 265 is operated. Furthermore, it is illustrated that cleaning of the electrode needles en1 and en2 by the cleaning device 291 is started when the power button 267 is pressed long.

When the up button 261 is operated on the air volume adjustment screen 510, the air volume level increases by the number of times the up button 261 has been operated up to Air volume level “7”. Further, when the down button 262 is operated, the air volume level decreases by the number of times the down button 262 has been operated up to Air volume level “1”.

Figure 13:
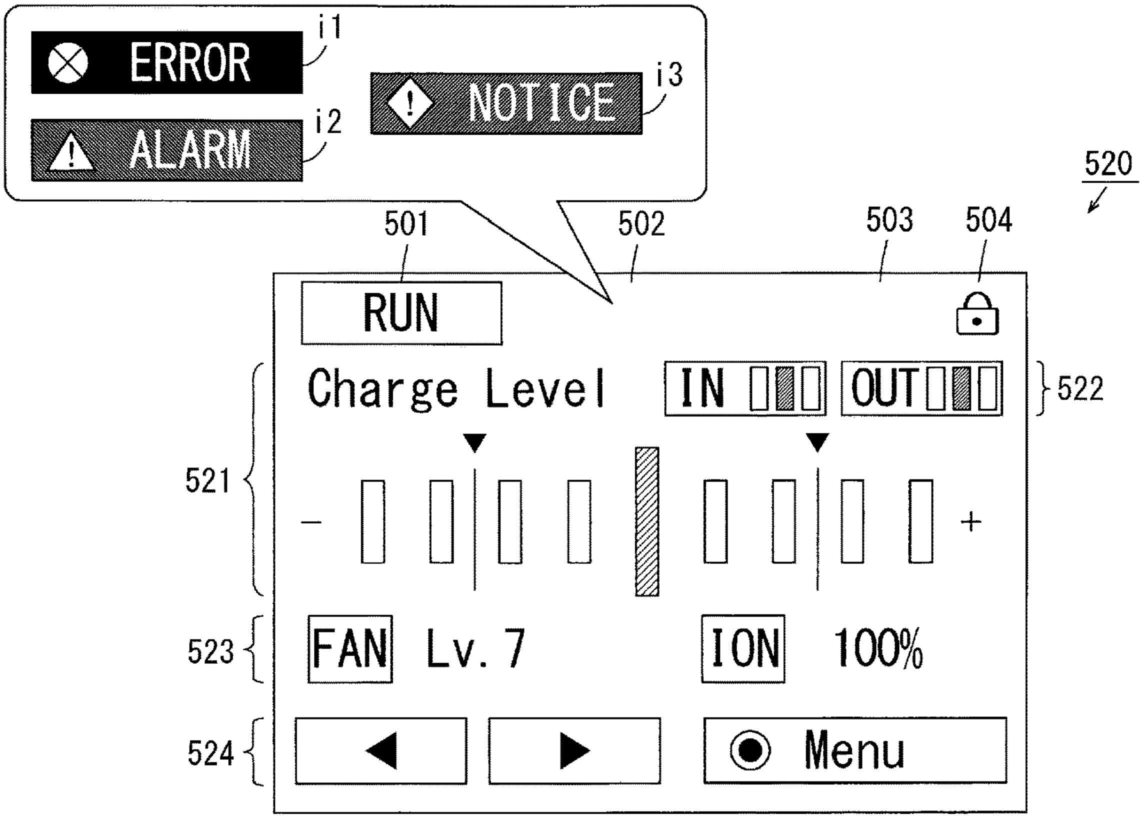
FIG. 13 is a view illustrating an example of a first monitor screen.

FIG. 13 is a view illustrating an example of the first monitor screen 520. As illustrated in FIG. 13, the running state display area 501, the event display area 502, the eco-mode display area 503, and the lock mode display area 504 are displayed on the first monitor screen 520. Further, a charge level display area 521, an input/output display area 522, a static elimination performance display area 523, and an explanation display area 524 are displayed on the first monitor screen 520.

In the static elimination system 1 according to the present embodiment, the return ion balance is detected by the external ion current detection circuit 242 as described above. According to the return ion balance, it is possible to calculate a rough level (charge level) of a charge amount of the object 9 and evaluate a calculation result.

In the charge level display area 521, a character string “Charge Level” is displayed. Further, in the charge level display area 521, the charge level of the object calculated based on the return ion balance is displayed using a gauge. Note that the return ion balance may be treated as the charge level. Furthermore, a line indicating a threshold of the charge level is displayed in the charge level display area 521. In this example, the charge level is displayed as a vertically extending bar moves to the left and right.

Specifically, when the charge level is close to 0, the bar is located at the center. When the charge level is negatively high, the bar moves to the left. When the charge level is positively high, the bar moves to the right. A color of the bar to be displayed may vary depending on whether or not the charge level is within a threshold range. In the example of FIG. 13, the charge level is within the threshold range. Therefore, the bar is displayed in green, for example. On the other hand, when the charge level is out of the threshold range, the bar is displayed in red.

The static eliminator 200 according to the present embodiment is provided with first to third input terminals (not illustrated) and first to third output terminals (not illustrated). A control apparatus, such as a programmable controller, can be connected to each of the terminals.

In the input/output display area 522, icons respectively representing the first to third input terminals are displayed in order from left to right together with a character string “IN”. Further, icons respectively representing the first to third output terminals are displayed in order from left to right together with a character string “OUT”. Each of the icons is displayed in a first mode (for example, green) when the input terminal or the output terminal corresponding to the icon is in use. On the other hand, each of the icons is displayed in a second mode (for example, white) when the input terminal or the output terminal corresponding to the icon is not in use. In the example of FIG. 13, the icon displayed in the first mode is hatched. In this case, it can be seen that the second input terminal and the second output terminal are in use.

In the static elimination performance display area 523, a measurement value related to static elimination performance and a predetermined character string corresponding to the measurement value are displayed. In this example, in the static elimination performance display area 523, the air volume level of the fan 201 and the amount of ions generated by the positive ion generation unit 211 and the positive-polarity-side high voltage circuit 212 are displayed as measurement values related to a static elimination time period out of the static elimination performance. Further, character strings of “FAN” and “ION” are displayed in the static elimination performance display area 523. Note that the static elimination time period means a time period required to neutralize an electric charge of a metal plate holding the amount of the electric charge defined by the standard.

In this example, the amount of ions is displayed not as an absolute value but as a relative value compared with the amount of generated ions in a reference state (for example, a state at the time of shipment) of the static eliminator 200. Therefore, the unit of the amount of ions is %. The user can evaluate the static elimination time period based on the air volume level and the amount of ions displayed in the static elimination performance display area 523. Specifically, as the air volume level is higher and the amount of ions is larger, more ions can be supplied, and thus, the static elimination time period is shortened.

Similar to the explanation display area 513 of the air volume adjustment screen 510, simplified explanations of some buttons of the operation unit 260 are displayed in the explanation display area 524. Note that an explanation about the long press of the power button 267 is not displayed in the explanation display area 524 in the example of FIG. 13, but the embodiment is not limited thereto. In a case where the explanation display area 524 has a sufficiently wide display space, the explanation about the long press of the power button 267 may be displayed in the explanation display area 524 as in the explanation display area 513.

As described above, in the event display area 502, when any event belonging to the error event, the alarm event, or the notification event is detected, an icon and a character string indicating a type of the event are displayed. FIG. 13 illustrates three images i1, i2, and i3 displayed in the event display area 502 to correspond to the error event, the alarm event, and the notification event, respectively, when these events occur.

The image it corresponding to the error event is displayed in the event display area 502 in a state where a circular icon indicating the error event and a character string "ERROR" are decorated in a specific color (for example, red). The image i2 corresponding to the alarm event is displayed in the event display area 502 in a state where a triangular icon indicating the alarm event and a character string "ALARM" are decorated in another color (for example, yellow). The image i3 corresponding to the notification event includes a diamond-shaped icon indicating the notification event and a character string "NOTICE", and is displayed in the event display area 502 in still another color (for example, orange).

Figure 14:
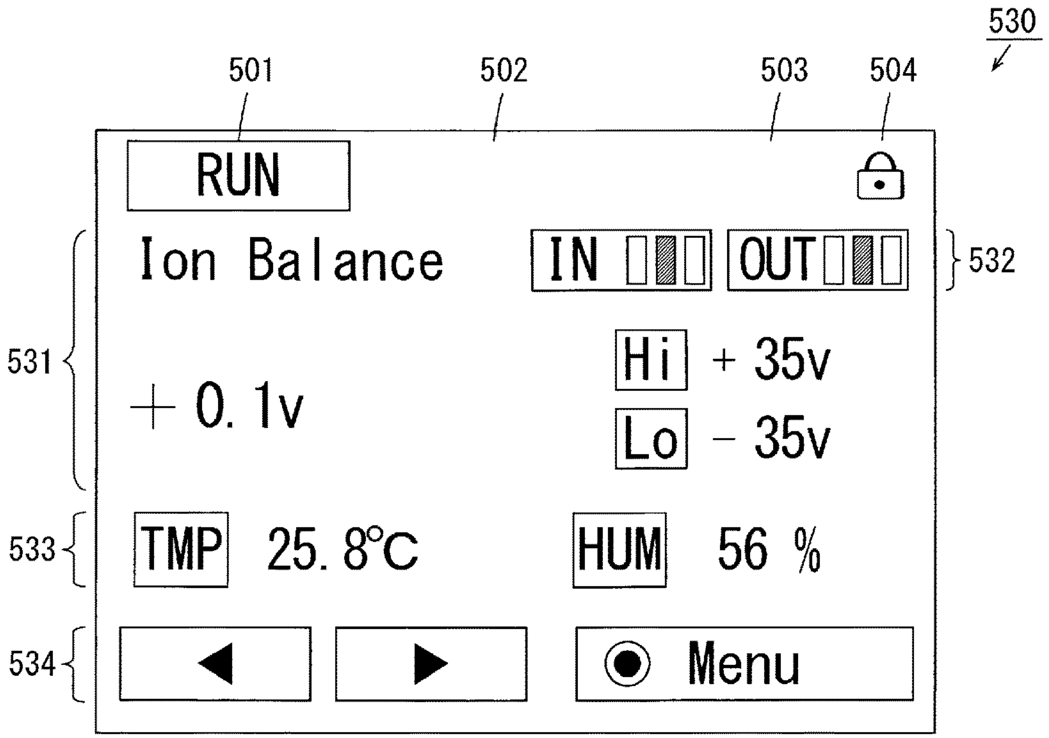
FIG. 14 is a view illustrating an example of a second monitor screen.

FIG. 14 is a view illustrating an example of the second monitor screen 530. As illustrated in FIG. 14, the running state display area 501, the event display area 502, the eco-mode display area 503, and the lock mode display area 504 are displayed on the second monitor screen 530. Further, an ion balance display area 531, an input/output display area 532, a temperature and humidity display area 533, and an explanation display area 534 are displayed on the second monitor screen 530.

In the ion balance display area 531, a character string "Ion Balance" is displayed. Further, a numerical value of the ion balance measured by the ion balance sensor 100 is displayed in the ion balance display area 531. The unit of the ion balance is V (volt). Furthermore, an upper limit threshold (ion balance threshold to be described later) preset for the ion balance is displayed in the ion balance display area 531 together with a character string "Hi". Further, a lower limit threshold (ion balance threshold to be described later) preset for the ion balance is displayed together with a character string "Lo". Similarly to the input/output display area 522 of the first monitor screen 520, use states of the input terminals and the output terminals are displayed in the input/output display area 532.

In the temperature and humidity display area 533, a temperature measured by the ion balance sensor 100 is displayed together with a character string "TMP". Further, in the temperature and humidity display area 533, humidity measured by the ion balance sensor 100 is displayed together with a character string "HUM". Similar to the explanation display area 524 of the first monitor screen 520, the explanation display area 534 displays simple explanations of some buttons of the operation unit 260.

Also on the second monitor screen 530, when the occurrence of an event related to the ion balance, the temperature, or the humidity is detected, any one of the images i1 to i3 of FIG. 13 indicating a type of the event is displayed in the event display area 502. Further, the character string such as "Ion Balance","TMP", or "HUM" is displayed in a state of being decorated with a color similar to the decorative color of any of the images i1 to i3 displayed in the event display area 502.

Figure 15:
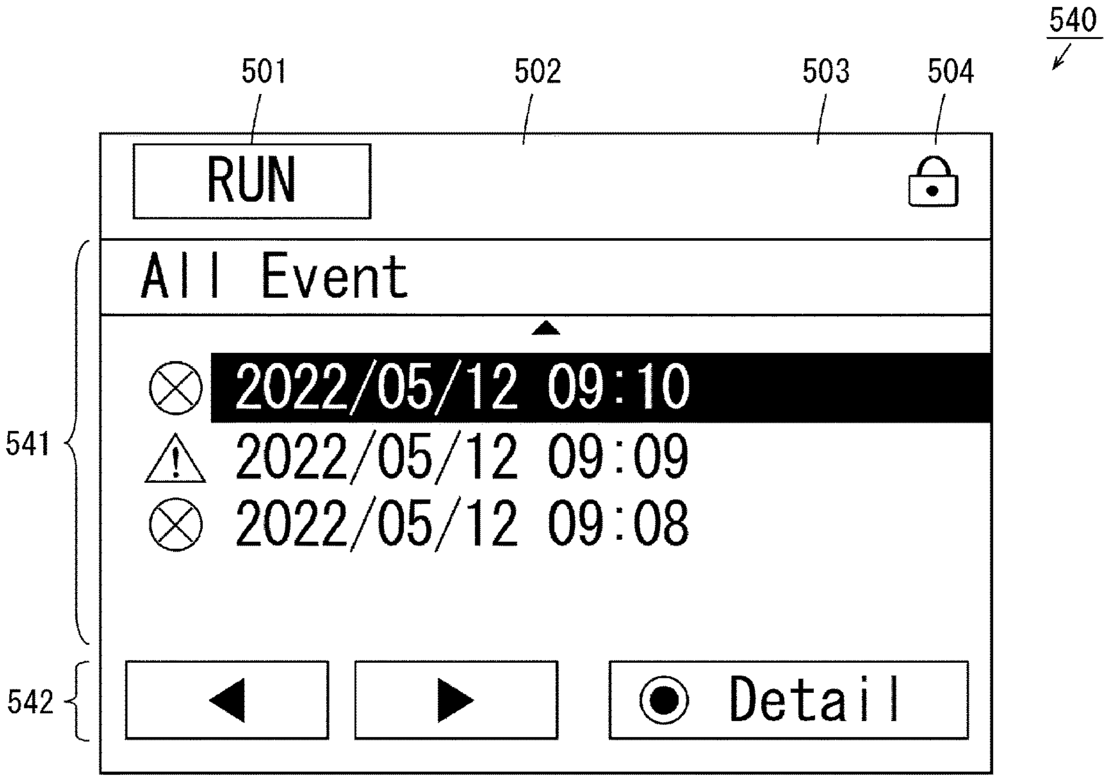
FIG. 15 is a view illustrating an example of an event history screen.
Figure 16:
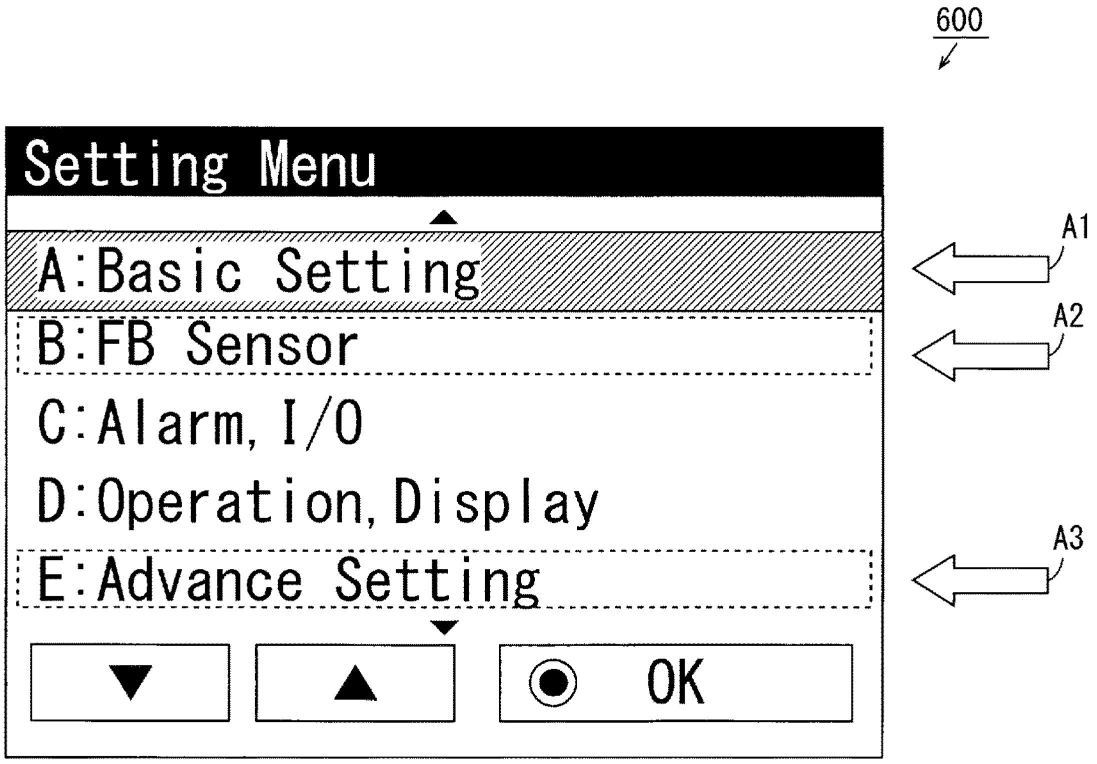
FIG. 16 is a view illustrating an example of a second layer screen.

FIG. 15 is a view illustrating an example of the event history screen 540. As illustrated in FIG. 16, the running state display area 501, the event display area 502, the eco-mode display area 503, and the lock mode display area 504 are displayed on the event history screen 540. Further, an all-event display area 541 and an explanation display area 542 are also displayed on the event history screen 540.

A character string "All Event" is displayed in the all-event display area 541. Further, in the all-event display area 541, occurrence dates and times of all detected events are displayed so as to be aligned in the vertical direction. For each of the detected events, an icon indicating a type of the event is displayed next to the occurrence date and time. This icon is the same as the icon displayed in the event display area 502 when the event is detected.

The user can easily recognize a type of each of the events that have occurred by visually recognizing a type of the icon in the all-event display area 541. In the example of FIG. 15, occurrence dates and times of three events are displayed in the all-event display area 541. Types of these three events are respectively the error event, the alarm event, and the error event from the top.

When one or a plurality of occurrence dates and times are displayed in the all-event display area 541, one occurrence date and time among the one or plurality of occurrence dates and times is displayed as an occurrence date and time of an event selected by the user in a mode distinguishable from the other occurrence dates and times. The user can select a desired event by operating the up button 261 or the down button 262 of the operation unit 260.

In the explanation display area 542, simple explanations of some buttons of the operation unit 260 are displayed. The example of FIG. 15 illustrates that the event history screen 540 is switched to another first layer screen 500 by operating the left button 263 or the right button 264. Further, it is illustrated that the screen transitions to an event detail screen illustrating details of the event selected by the user when the OK button 265 is operated.

In this example, one event history screen 540 is displayed as the first layer screen 500, but the embodiment is not limited thereto. The first layer screen 500 may include, in addition to the event history screen 540 described above, one or a plurality of other event history screens that display only an occurrence date and time of a specific type of event from all detected events. In this case, one or a plurality of other event history screens are switchably displayed on the display unit 250 as the first layer screen 500, in addition to the first monitor screen 520, the second monitor screen 530, and the event history screen 540.

When the OK button 265 of the operation unit 260 is operated in a state where the air volume adjustment screen 510, the first monitor screen 520, or the second monitor screen 530 is displayed on the display unit 250, the second layer screen is displayed on the display unit 250. FIG. 16 is a view illustrating an example of the second layer screen. A second layer screen 600 of FIG. 16 is the menu screen for performing various settings. Note that the display of the display unit 250 returns to the immediately preceding first layer screen 500 when the cancel button 266 of the operation unit 260 is operated in a state where the second layer screen 600 is displayed on the display unit 250.

As illustrated in FIG. 16, a plurality of setting target items are displayed on the second layer screen 600 so as to be aligned in the vertical direction. The plurality of setting target items include a basic setting of the static eliminator 200, a setting related to the ion balance sensor 100, an advance setting of the static eliminator 200, and the like.

Specifically, on the second layer screen 600, an item of the basic setting of the static eliminator 200 is indicated by a character string "A: Basic Setting" (a white arrow A1 in FIG. 16). Further, an item of the setting related to the ion balance sensor 100 is indicated by a character string "B: FB Sensor" (a white arrow A2 in FIG. 16). Furthermore, an item of the advance setting of the static eliminator 200 is indicated by a character string "E: Advance Setting" (an white arrow A3 in FIG. 16). The user can select a desired item by operating the up button 261 or the down button 262 of the operation unit 260. The selected item is displayed in a mode distinguishable from the other items. In the example of FIG.

16, the item of the basic setting of the static eliminator 200 is selected as indicated by hatching.

Here, the setting related to the ion balance sensor 100 is an unnecessary setting target in the case where the ion balance sensor 100 is not connected to the static eliminator 200. Therefore, the item of the setting related to the ion balance sensor 100 can be selected by the user in the case where the ion balance sensor 100 is connected to the static eliminator 200. On the other hand, the item of the setting related to the ion balance sensor 100 is not selectable by the user, and is displayed to be lighter (grayed out) than the other items in the case where the ion balance sensor 100 is not connected to the static eliminator 200.

When the OK button 265 is operated in a state where any setting target item is selected on the second layer screen 600, a third layer screen and subsequent setting screens for performing a setting corresponding to the selected item are displayed on the display unit 250.

There is a possibility that calculation performance of the charge level changes depending on the use of the static eliminator 200 over time, the use environment of the static eliminator 200, and the like. In this case, the reliability of the charge level displayed in the charge level display area 521 of FIG. 13 deteriorates. Therefore, the static eliminator 200 is configured to be capable of calibration of the charge level displayed in the charge level display area 521 of FIG. 13 (hereinafter, referred to as charge level calibration).

The charge level calibration means, for example, adjusting the charge level displayed in the charge level display area 521 to a value corresponding to an actual charge amount of the object 9 measured by another measuring instrument. In the charge level calibration of this example, an offset is set to the charge level calculated in the static eliminator 200 such that the charge level indicates a reference value when the actual charge amount of the object 9 is zero (setting of a zero point of the charge level).

The user can perform the charge level calibration by operating the operation unit 260 regardless of whether or not the ion balance sensor 100 is connected to the static eliminator 200. An operation example of the operation unit 260 when the user performs the charge level calibration will be described together with a transition of a screen displayed on the display unit 250.

Figure 17:
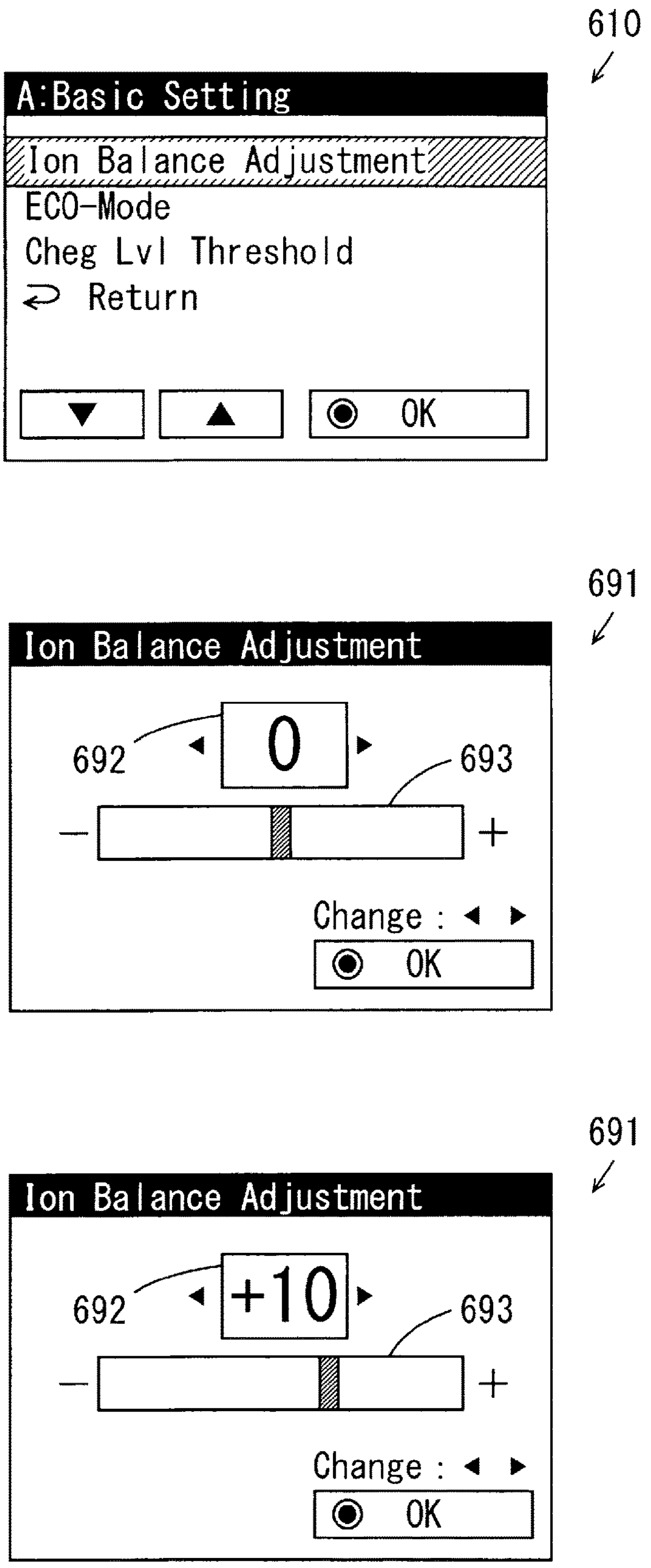
FIG. 17 is a view illustrating an example of a screen transition of the display unit at the time of charge level calibration.

FIG. 17 is a view illustrating an example of a screen transition of the display unit 250 at the time of the charge level calibration. In a case where the charge level calibration is performed, the up button 261 or the down button 262 of the operation unit 260 is operated on the second layer screen 600 of FIG. 16, so that the item of the basic setting of the static eliminator 200 (the item indicated by the white arrow A1 in FIG. 16) is selected. Further, the OK button 265 is operated in a state where the item of the basic setting of the static eliminator 200 has been selected.

As a result, as illustrated in the upper part of FIG. 17, a third layer screen 610 corresponding to the basic setting of the static eliminator 200 is displayed on the display unit 250. On the third layer screen 610 of FIG. 17, a plurality of setting target items classified as the basic setting of the static eliminator 200 are displayed to be aligned in the vertical direction. The plurality of setting target items illustrated on the third layer screen 610 include the charge level calibration, a setting related to the eco-mode, and a setting of a charge level threshold.

Specifically, an item of the charge level calibration is indicated by a character string "Ion Balance Adjustment" on the third layer screen 610 in FIG. 17. Further, an item of the setting related to the eco-mode is indicated by a character string "ECO-Mode". Furthermore, an item of the setting of the charge level threshold is indicated by a character string "Cheg Lvl Threshold". Furthermore, on the third layer screen 610, an item for returning the screen displayed on the display unit 250 to the previous screen (the second layer screen 600 in FIG. 16) is indicated by a character string "Return" together with the above-described various setting items.

In this state, the up button 261 or the down button 262 of the operation unit 260 is operated to select the item of the charge level calibration, and the OK button 265 is operated. As a result, a charge level calibration screen 691 is displayed on the display unit 250 as illustrated in the middle part of FIG. 17.

On the charge level calibration screen 691, a numerical value display frame 692 and a level gauge 693 are displayed substantially at the center of the screen. The numerical value display frame 692 displays an offset value of the charge level to be adjusted as the charge level calibration. Further, in the level gauge 693, the offset value of the charge level numerically displayed in the numerical value display frame 692 is displayed using a strip gauge. More specifically, the level gauge 693 is displayed to extend laterally and includes a bar portion representing the offset value within a certain range. Further, the level gauge 693 includes a marker displayed to be movable to the left and right on the bar portion. A position of the marker in the bar portion corresponds to the offset value of the charge level displayed in the numerical value display frame 692. When the left button 263 or the right button 264 of the operation unit 260 is operated, the offset value of the charge level increases or decreases. The lower part of FIG. 17 illustrates an example of the charge level calibration screen 691 during the charge level calibration.

After the offset value of the charge level displayed in the numerical value display frame 692 and the level gauge 693 is adjusted to a value desired by the user, the OK button 265 is operated. As a result, the offset value of the charge level displayed by the numerical value display frame 692 and the level gauge 693 is set. Further, the screen displayed on the display unit 250 returns from the charge level calibration screen 691 to the third layer screen 610.

The offset value of the charge level set in the charge level calibration is stored in the static eliminator storage unit 270 of FIG. 3 as information for displaying the charge level on the first monitor screen 520 of FIG. 13.

There is a possibility that the detection performance of various physical quantities by the ion balance sensor 100 changes depending on the use of the ion balance sensor 100 and the static eliminator 200 over time, the use environment of the ion balance sensor 100 and the static eliminator 200, and the like. In this case, the reliability of a numerical value of the ion balance displayed in the ion balance display area 531 of FIG. 14 deteriorates. Therefore, the static eliminator 200 is configured to be capable of calibration of the ion balance displayed in the ion balance display area 531 of FIG. 14 (hereinafter, referred to as ion balance calibration).

The ion balance calibration means that, for example, a value of the ion balance in the target space 3 displayed in the ion balance display area 531 is adjusted to a value of the actual ion balance in the target space 3 measured by another measuring instrument, which is substantially similar to the charge level calibration. In the ion balance calibration of this example, an offset is set to the ion balance detected in the static eliminator 200 or the ion balance sensor 100 such that the value of the ion balance displayed in the ion balance display area 531 indicates a reference value (0) when the value of the actual ion balance in the target space 3 is zero (setting of a zero point of the ion balance).

The user can perform the ion balance calibration by operating the operation unit 260 in the case where the ion balance sensor 100 is connected to the static eliminator 200. An operation example of the operation unit 260 when the user performs the ion balance calibration will be described together with a transition of a screen displayed on the display unit 250.

Figure 18:
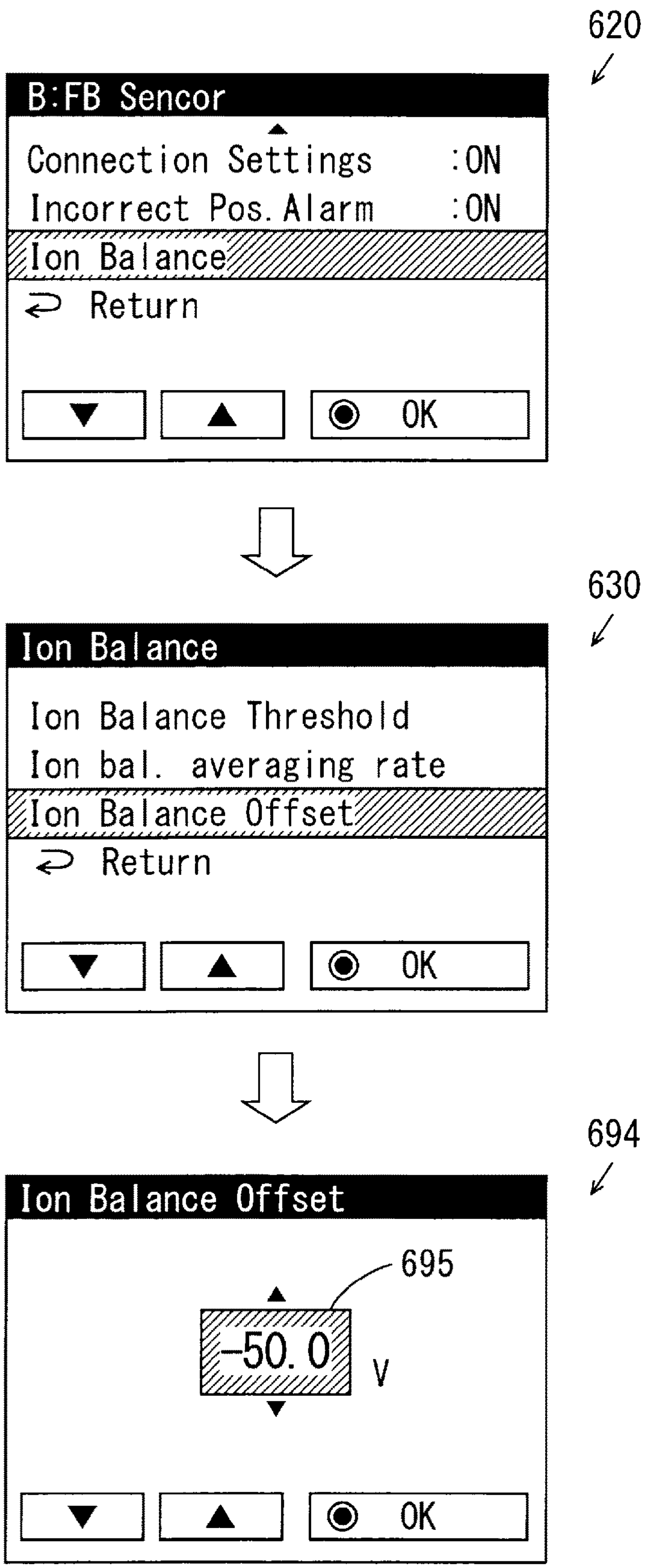
FIG. 18 is a view illustrating an example of a screen transition of the display unit at the time of ion balance calibration.

FIG. 18 is a view illustrating an example of a screen transition of the display unit 250 at the time of the ion balance calibration. As described above, the item of the setting related to the ion balance sensor 100 (item indicated by the white arrow A2 in FIG. 16) can be selected on the second layer screen 600 in FIG. 16 in the case where the ion balance sensor 100 is connected to the static eliminator 200. Therefore, in a case where the ion balance calibration is performed, the up button 261 or the down button 262 of the operation unit 260 is operated on the second layer screen 600 of FIG. 16 so that the item of the setting related to the ion balance sensor 100 is selected. Further, the OK button 265 is operated in a state where the item of the setting related to the ion balance sensor 100 is selected.

As a result, a third layer screen 620 corresponding to the settings related to the ion balance sensor 100 is displayed on the display unit 250 as illustrated in the upper part of FIG. 18. A plurality of setting target items classified as the setting related to the ion balance sensor 100 are displayed on the third layer screen 620 of FIG. 18 so as to be aligned in the vertical direction. The plurality of setting target items illustrated on the third layer screen 620 include sensor connection settings, an installation abnormality setting, and an ion balance detection setting.

Specifically, on the third layer screen 620, an item of the sensor connection settings is indicated by a character string “Connection Settings”. Further, an item of the installation abnormality setting is indicated by a character string “Incorrect Pos.Alarm”. Furthermore, an item of the ion balance detection setting is indicated by a character string “Ion Balance”. Furthermore, on the third layer screen 620, an item for returning the screen displayed on the display unit 250 to the previous screen (the second layer screen 600 in FIG. 16) is indicated by a character string “Return” together with the above-described various setting items.

In this state, the up button 261 or the down button 262 of the operation unit 260 is operated to select the item of the ion balance detection setting, and the OK button 265 is operated. As a result, a fourth layer image 630 corresponding to the ion balance detection setting is displayed on the display unit 250 as illustrated in the middle part of FIG. 18.

In the fourth layer image 630 of FIG. 18, a plurality of setting target items classified as the ion balance detection setting are displayed to be aligned in the vertical direction. The plurality of setting target items illustrated in the fourth layer image 630 include an ion balance threshold setting, an ion balance averaging setting, and ion balance calibration.

Specifically, in the fourth layer image 630, an item of the ion balance threshold setting is indicated by a character string “Ion Balance Threshold”. Further, an item of the ion balance averaging setting is indicated by a character string “Ion bal.averaging rate”. Furthermore, an item of the ion balance calibration is indicated by a character string “Ion Balance Offset”. Furthermore, on the fourth layer image 630, an item for returning the screen displayed on the display unit 250 to the previous screen (the third layer screen 620 in the upper part of FIG. 18) is indicated by a character string “Return” together with the above-described various setting items.

Note that the ion balance threshold is a value displayed in the ion balance display area 531 of FIG. 14 as described above, and is used, for example, to determine whether or not the ion balance in the target space 3 deviates from a range allowed in advance as a static elimination condition. Further, a plurality of detection values of the ion balance detected by the ion balance sensor 100 at a predetermined cycle are averaged in the static eliminator 200 according to the present embodiment. The averaged detection value is displayed in the ion balance display area 531 of FIG. 14. In the ion balance averaging setting, the number of detection values to be averaged is set.

The up button 261 or the down button 262 of the operation unit 260 is operated in a state where the fourth layer image 630 in the middle part of FIG. 18 is displayed on the display unit 250, the item of the ion balance calibration is selected, and the OK button 265 is operated. As a result, an ion balance calibration screen 694 corresponding to the ion balance calibration is displayed on the display unit 250 as illustrated in the lower part of FIG. 18.

On the ion balance calibration screen 694, a numerical value display frame 695 is displayed substantially at the center of the screen. An offset value of ion balance to be adjusted as the ion balance calibration is displayed in the numerical value display frame 695. Further, V (volt) indicating the unit of ion balance is displayed on the right side of the numerical value display frame 695. In this example, the offset value of ion balance increases or decreases as the up button 261 or the down button 262 of the operation unit 260 is operated.

After the offset value of ion balance is adjusted to a value desired by the user, the OK button 265 is operated. As a result, an offset value (−50.0 V in the example of FIG. 18) of a charge level displayed by the numerical value display frame 695 is set. Further, the screen displayed on the display unit 250 returns from the ion balance calibration screen 694 to the fourth layer image 630 corresponding to the ion balance detection setting.

The offset value of ion balance set in the ion balance calibration is stored in the static eliminator storage unit 270 of FIG. 3 as information for displaying the ion balance on the second monitor screen 530 of FIG. 14.

Although the operation example in the case of performing the ion balance calibration among the plurality of items displayed on the fourth layer image 630 has been described in the example of FIG. 18, the user can also set the ion balance threshold by selecting the item of the ion balance threshold setting in the fourth layer image 630. Further, the user can also set the number of detection values to be averaged for obtaining a value of the ion balance displayed on the display unit 250 by selecting the ion balance averaging setting in the fourth layer image 630. When these are set, a dedicated screen for setting each item is displayed on the display unit 250 similarly to the ion balance calibration screen 694 illustrated in the lower part of FIG. 18.

In the static elimination system 1, the user can set a temperature threshold and a humidity threshold for the temperature and the humidity detected by the ion balance sensor 100 as static elimination conditions related to the ion balance sensor 100, in addition to the above-described various setting items.

Also in this case, a screen for setting the temperature threshold and a screen for setting the humidity threshold are displayed on the display unit 250 according to operations of the operation unit 260 by the user. However, information regarding the temperature and the humidity of the target space 3 is not acquired as long as the ion balance sensor 100 is not connected to the static eliminator 200. Therefore, in the case where the ion balance sensor 100 is not connected to the static eliminator 200, the screens for setting the temperature threshold and the humidity threshold are not displayed on the display unit 250 even if the user operates the operation unit 260.

8. Processing According to Connection State Between Ion Balance Sensor 100 and Static Eliminator 200

As described above, the static eliminator control unit 230 in FIG. 3 performs control differently between the case where the ion balance sensor 100 is connected to the static eliminator 200 and the case where the ion balance sensor 100 is not connected to the static eliminator 200. Such a process of switching control is referred to as a control switching process. The control switching process is performed as the CPU of the static eliminator control unit 230 executes a control switching program stored in advance in the memory of the static eliminator storage unit 270 or the memory of the static eliminator control unit 230 in FIG. 3.

Figure 19:
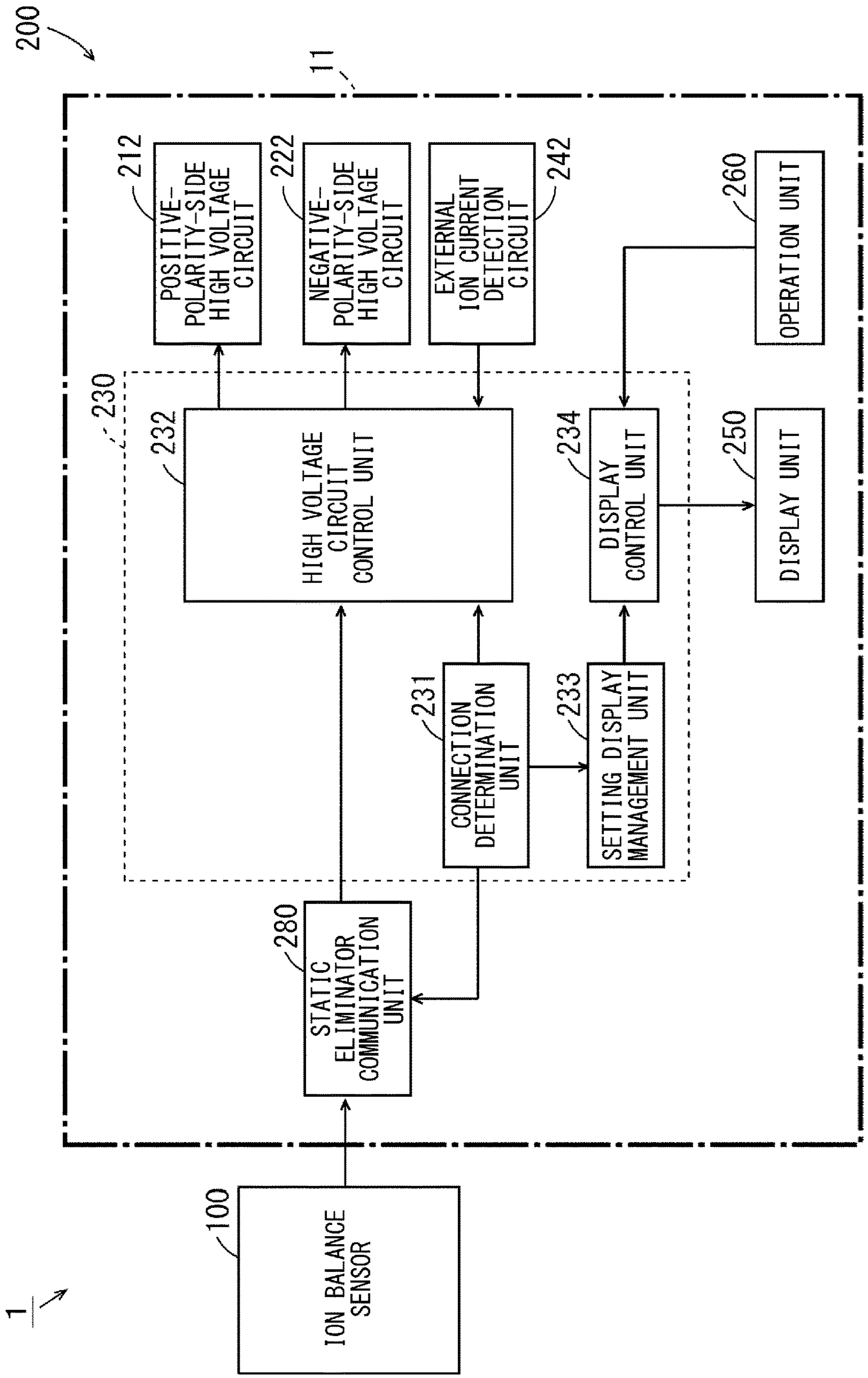
FIG. 19 is a block diagram illustrating various functional units of a static eliminator control unit implemented by executing a control switching program.

FIG. 19 is a block diagram illustrating various functional units of the static eliminator control unit 230 implemented by executing the control switching program. FIG. 19 illustrates some constituent elements among a plurality of constituent elements of the static eliminator control unit 230 together with the functional units of the static eliminator control unit 230.

As illustrated in FIG. 19, the static eliminator control unit 230 includes a connection determination unit 231, a high voltage circuit control unit 232, a setting display management unit 233, and a display control unit 234 as the functional units. Note that some or all of the plurality of functional units may be implemented by hardware such as an electronic circuit.

Figure 20:
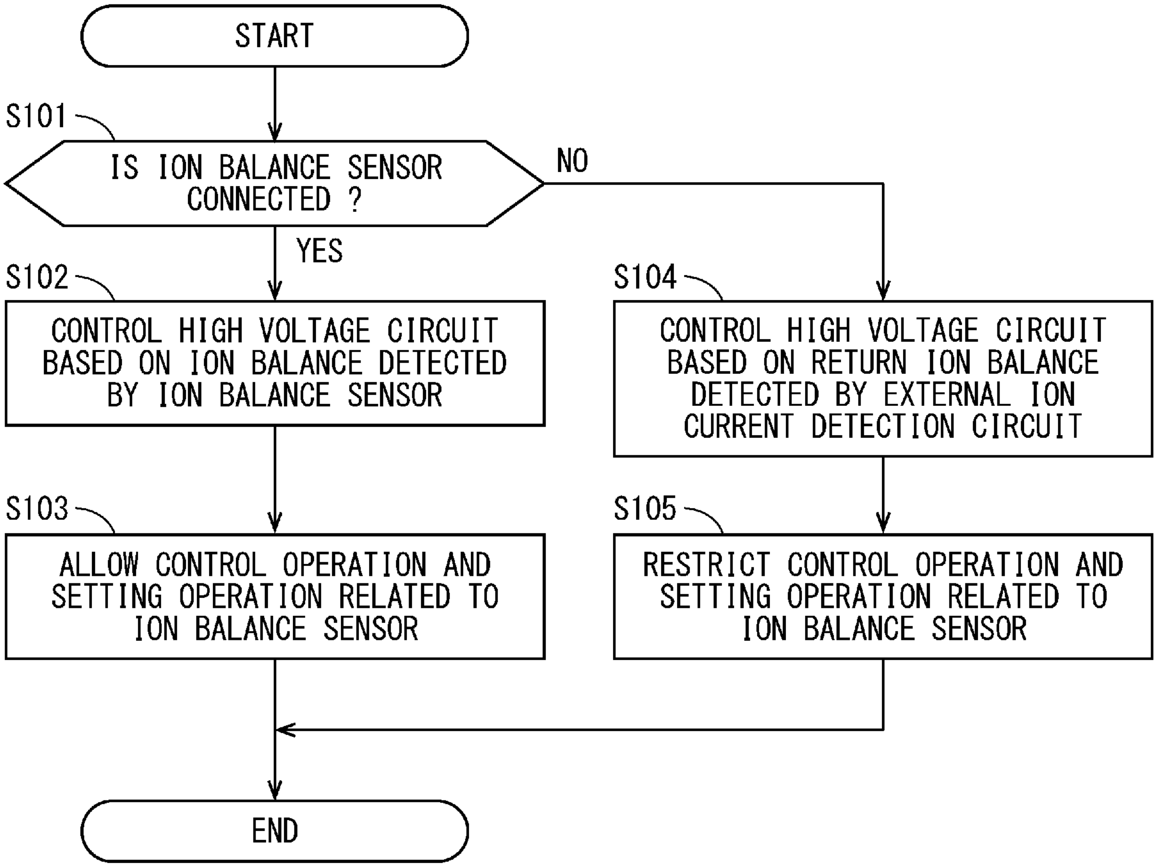
FIG. 20 is a flowchart illustrating an example of a control switching process.

Operations of the respective functional units (231, 232, 233, and 234) in FIG. 19 will be described with reference to a flowchart of the control switching process. FIG. 20 is a flowchart illustrating an example of the control switching process. The control switching process of FIG. 20 is repeated at a constant cycle while the static eliminator 200 is in an ON state.

When the control switching process is started, the connection determination unit 231 in FIG. 19 determines whether or not the ion balance sensor 100 is connected to the static eliminator 200 (Step S101). This determination processing may be performed, for example, based on whether or not the static eliminator communication unit 280 has received any signal from the ion balance sensor 100.

Note that a case is assumed in which a terminal portion of the static eliminator 200 to which the relay cable CA1 is connected is configured to be capable of detecting whether or not the relay cable CA1 is connected to the terminal portion. In this case, the connection determination unit 231 may determine whether or not the ion balance sensor 100 is connected to the static eliminator 200 based on a detection result of the terminal portion.

Next, when the ion balance sensor 100 is connected to the static eliminator 200, the high voltage circuit control unit 232 controls the positive-polarity-side high voltage circuit 212 and the negative-polarity-side high voltage circuit 222 based on ion balance detected by the ion balance sensor 100 (Step S102). Further, the setting display management unit 233 allows a control operation and a setting operation related to the ion balance sensor 100 for each constituent element of the static eliminator 200 (Step S103), and ends the control switching process.

In Step S101 described above, when the ion balance sensor 100 is not connected to the static eliminator 200, the high voltage circuit control unit 232 controls the positive-polarity-side high voltage circuit 212 and the negative-polarity-side high voltage circuit 222 based on return ion balance detected by the external ion current detection circuit 242 (Step S104). Further, the setting display management unit 233 restricts a control operation and a setting operation related to the ion balance sensor 100 for each constituent element of the static eliminator 200 (Step S105), and ends the control switching process.

In a case where the control operation and the setting operation related to the ion balance sensor 100 are allowed, the display control unit 234 causes the display unit 250 to display information related to a detection result of the return ion balance obtained by the external ion current detection circuit 242 and information related to a detection result of the ion balance obtained by the ion balance sensor 100.

On the other hand, in a case where the control operation and the setting operation related to the ion balance sensor 100 are restricted, the display control unit 234 causes the display unit 250 to display the information related to the detection result of the return ion balance obtained by the external ion current detection circuit 242, but does not cause the display unit 250 to display the information related to the ion balance sensor 100. Alternatively, the display control unit 234 causes the display unit 250 to display the information related to the ion balance sensor 100 while indicating that setting work is not possible (to be grayed out or the like).

As a specific example, in the example of FIG. 11, the first monitor screen 520 corresponds to a screen indicating the information related to the detection result of the return ion balance obtained by the external ion current detection circuit 242. Further, the second monitor screen 530 corresponds to a screen indicating the information related to the ion balance sensor 100.

As a result, in the case where the control operation and the setting operation related to the ion balance sensor 100 are allowed, the display control unit 234 causes the display unit 250 to display the four first layer screens 500 including the first monitor screen 520 and the second monitor screen 530 based on the user's operation on the operation unit 260. On the other hand, in the case where the control operation and the setting operation related to the ion balance sensor 100 are restricted, the display control unit 234 causes the display unit 250 to display the three first layer screens 500 excluding the second monitor screen 530 based on the user's operation on the operation unit 260.

9. Effects (a) According to the ion balance sensor 100, the detection plate 110A is arranged in the target space 3 so that ion balance in the target space 3 is detected based on a voltage waveform of a signal output from the ion detection circuit 110B. Further, the ion balance signal indicating a detection result of the ion balance is generated. As a result, the ion balance in the target space 3 can be grasped based on the ion balance signal.

Furthermore, an ion current in the target space 3 is detected as information regarding an environment of the target space 3 based on a voltage waveform of a signal output from the ion detection circuit 110B. Further, the ion current signal indicating a detection result of the ion current is generated. As a result, the ion current in the target space 3 can be grasped based on the ion current signal. In this case, a user can adjust an installation state of the static eliminator 200 based on a magnitude of the ion current in the target space 3.

(b) According to the ion balance sensor 100, the sensor housing 400 is arranged in the target space 3 so that a temperature of the target space 3 can be managed based on an output of the temperature detection element 120. Further, humidity of the target space 3 can be managed based on an output of the humidity detection element 130.

(c) In the ion balance sensor 100, a configuration for detecting the ion balance, the ion current, the temperature, and the humidity of the target space 3, the sensor communication unit 150, and the sensor power supply unit 160 are integrally provided in the sensor housing 400 together with the detection plate 110A. The sensor housing 400 is connected to the static eliminator 200 via the relay cable CAL Therefore, the sensor housing 400 can be easily arranged in the target space 3 spaced apart from the static eliminator 200. This improves the handleability of the ion balance sensor 100.

Furthermore, the ion balance signal, the ion current signal, the temperature signal, and the humidity signal are sent from the ion balance sensor 100 to the static eliminator 200. As a result, the static eliminator 200 can control an operation state and adjust the installation state based on the ion balance signal, the ion current signal, the temperature signal, and the humidity signal.

10. Other Embodiments (a) The ion balance sensor 100 according to the above-described embodiment is used in a state of being connected to the static eliminator 200 as a part of constituent elements of the static elimination system 1, but the invention is not limited thereto.

The ion balance sensor 100 may be configured separately from the static eliminator 200 without being connected to the static eliminator 200. In this case, the ion balance sensor 100 includes a power supply device separated from the static eliminator 200 using a battery or the like, and is configured to be operable by power of the power supply device. Further, in this case, the ion balance sensor 100 may include a display device that presents detection results of ion balance and an ion current in a space surrounding the detection plate 110A to a user.

(b) At least one of the ion balance sensor 100 and the static eliminator 200 may have a sound output device. In this case, when the ion balance and the ion current detected by the ion balance sensor 100 do not satisfy allowable conditions, the sound output device may output a message or an alarm indicating that the ion balance and the ion current do not satisfy the allowable conditions.

(c) The ion balance sensor 100 according to the above-described embodiment includes the temperature detection element 120 and the humidity detection element 130, but one of the temperature detection element 120 and the humidity detection element 130 is not necessarily provided, or both are not necessarily provided in a case where the ion current in the target space 3 can be detected. Further, in a case where the ion balance sensor 100 includes at least one of the temperature detection element 120 and the humidity detection element 130, the ion balance sensor 100 may be configured to be incapable of detecting the ion current in the target space 3.

(d) In the ion balance sensor 100 according to the above-described embodiment, a part or the whole of the relay cable CA1 connecting the sensor housing 400 and the static eliminator 200 may be configured to be detachable from the sensor housing 400. Further, the relay cable CA1 may be configured to be detachable from the static eliminator 200.

(e) In the ion detection circuit 110B according to the above-described embodiment, the modulation voltage source 113 generates the AC voltage as the modulation voltage having periodicity, but the invention is not limited thereto. The modulation voltage source 113 may generate another modulation voltage such as a rectangular wave or a saw tooth wave as a modulation voltage having periodicity.

(f) Although one circuit board 440 is provided in the sensor housing 400 in the ion balance sensor 100 according to the above-described embodiment, a plurality of circuit boards may be provided in the sensor housing 400. In this case, the ion detection circuit 110B, the temperature detection element 120, the humidity detection element 130, the sensor indicator lamp 140, the sensor communication unit 150, the sensor power supply unit 160, and the sensor control unit 190 in FIG. 2 are mounted on the plurality of circuit boards. In this manner, in the case of using the plurality of circuit boards, the temperature detection element 120 and the humidity detection element 130 are preferably mounted on a circuit board different from a circuit board on which heat sources (the ion detection circuit 110B, the sensor indicator lamp 140, the sensor communication unit 150, the sensor power supply unit 160, and the sensor control unit 190) are mounted.

(g) In the ion balance sensor 100 according to the above-described embodiment, other physical quantities such as a pressure of the target space 3 may be detected as information regarding the environment of the target space 3 in addition to the ion current, the temperature, and the humidity, or instead of the ion current, the temperature, and the humidity.

(h) The static eliminator 200 according to the above-described embodiment is configured to be operable in the eco-mode, but the invention is not limited thereto. The static eliminator 200 may be configured to be inoperable in the eco-mode. Further, the static eliminator 200 according to the above-described embodiment is configured to be operable in the lock mode, but the invention is not limited thereto. The static eliminator 200 may be configured to be inoperable in the lock mode.

11. Correspondence Relationship Between Each Constituent Element of Claims and Each Unit of Embodiment Hereinafter, an example of the correspondence between each constituent element of the claims and each unit of the embodiment will be described, but the invention is not limited to the following example. Various other elements having the configurations or functions described in the claims can be used as the respective constituent elements of the claims.

In the above-described embodiment, the target space 3 is an example of a target space; the detection plate 110A is an example of a detection plate; the ion balance signal is an example of a first information signal; the ion detection circuit 110B and the balance information generation unit 191 are examples of a first information generation unit; the ion current signal, the temperature signal, and the humidity signal are examples of a second information signal; the ion detection circuit 110B, the ion amount information generation unit 192, the temperature information generation unit 193, and the humidity information generation unit 194 are examples of a second information generation unit; the sensor communication unit 150 is an example of a sensor communication unit; and the ion balance sensor 100 is an example of an ion balance sensor.

Further, the fixed resistor 112 is an example of a fixed resistor; the node N is an example of a node; the modulation voltage source 113 is an example of a modulation voltage source; the operational amplifier 111, and the balance information generation unit 191 are examples of a potential detection unit; the ion amount information generation unit 192 is an example of an ion amount detection unit; the circuit board 440 is an example of one or a plurality of circuit boards; the sensor housing 400 is an example of a sensor housing; and the relay cable CA1 is an example of a relay cable.

Further, the detection surface 110S is an example of one surface of the detection plate; the temperature detection element 120 and the humidity detection element 130 are examples of a detection element; the first end portion 410 is an example of a first end portion of the sensor housing; the second end portion 420 is an example of a second end portion of the sensor housing; the holder 900 is an example of a holder; and the two attachment holes 421 of the sensor housing 400 are examples of an attachment portion.

Further, the positive ion generation unit 211, the positive-polarity-side high voltage circuit 212, the negative ion generation unit 221, and the negative-polarity-side high voltage circuit 222 of the static eliminator 200 are examples of an ion generation unit; the static eliminator communication unit 280 is an example of a static eliminator communication unit; the static eliminator control unit 230 is an example of an ion control unit; the static eliminator storage unit 270 is an example of an environmental state storage unit; the static elimination system 1 is an example of a static elimination system; the sensor power supply unit 160 is an example of a first power supply unit; and the static eliminator power supply unit 290 is an example of a second power supply unit.

Note that the invention is not limited to the above-described embodiments, and can be implemented in various modes within a range not departing from the gist of the invention, and can be implemented by combining some configurations of the above-described embodiments.

What is claimed is:

1. An ion balance sensor comprising:

a detection plate that is conductive and is arranged in a target space;

a first information generation unit that detects ion balance in the target space based on a potential of the detection plate and generates a first information signal indicating a detection result;

a second information generation unit that detects a physical quantity related to an environment of the target space and generates a second information signal indicating information regarding the environment of the target space based on a detection result; and a sensor communication unit that outputs the first information signal and the second information signal, wherein the second information generation unit includes:

a fixed resistor;

a modulation voltage source that is electrically connected to a node, electrically connected to the detection plate, via the fixed resistor and generates a modulation voltage having periodicity:

a potential detection unit that detects a potential of the node over time; and an ion amount detection unit that detects an amount of ions flowing in the target space based on a magnitude of an amplitude of a voltage waveform detected by the potential detection unit, and the second information signal includes a signal indicating the amount of the ions detected by the ion amount detection unit.

2. The ion balance sensor according to claim 1, wherein the first information generation unit detects a fluctuation center of the potential, detected by the potential detection unit of the second information generation unit, as the ion balance in the target space.

3. An ion balance sensor comprising:

a detection plate that is conductive and is arranged in a target space;

a first information generation unit that detects ion balance in the target space based on a potential of the detection plate and generates a first information signal indicating a detection result;

a second information generation unit that detects a physical quantity related to an environment of the target space and generates a second information signal indicating information regarding the environment of the target space based on a detection result;

a sensor communication unit that outputs the first information signal and the second information signal;

a sensor housing to which the detection plate is attached, the sensor housing accommodating one or a plurality of circuit boards; and a relay cable configured to be capable of connecting any of the one or plurality of circuit boards to a static eliminator, the relay cable transmitting the first information signal and the second information signal output from the sensor communication unit to the static eliminator, wherein the target space is a space where static elimination by the static eliminator is to be performed, and the first information generation unit, the second information generation unit, and the sensor communication unit are mounted on the one or plurality of circuit boards.

4. The ion balance sensor according to claim 3, wherein the detection plate has one surface that receives the ions of the target space, and is attached to the sensor housing with the one surface being exposed.

5. The ion balance sensor according to claim 3, further comprising a detection element configured to detect at least one of a temperature and humidity of the target space as the physical quantity, wherein the second information generation unit detects the physical quantity using the detection element, and the second information signal includes a signal indicating at least one of the temperature and the humidity detected by the detection element.

6. The ion balance sensor according to claim 5, wherein the sensor housing has a first end portion and a second end portion, extends in one direction from the first end portion to the second end portion, and has an accommodation space extending in the one direction, the detection element is arranged to be adjacent to the first end portion of the sensor housing in the accommodation space, and each of the first information generation unit and the second information generation unit is arranged to be spaced apart from the detection element by a certain distance in the accommodation space.

7. The ion balance sensor according to claim 6, further comprising a holder configured to be capable of holding the sensor housing, wherein the sensor housing has an attachment portion at the second end portion to attach the sensor housing to the holder, and the holder is not in contact with the first end portion of the sensor housing in a state where the sensor housing is attached to the holder.

8. A static elimination system comprising:

a static eliminator that outputs ions toward a target space where static elimination is to be performed; and an ion balance sensor connectable to the static eliminator, wherein the ion balance sensor includes:

a detection plate that is conductive and arranged in the target space;

a first information generation unit that detects ion balance in the target space based on a potential of the detection plate and generates a first information signal indicating a detection result;

a second information generation unit that detects a physical quantity related to an environment of the target space and generates a second information signal indicating information regarding the environment of the target space based on a detection result; and a sensor communication unit that outputs the first information signal and the second information signal to the static eliminator, and the static eliminator includes:

an ion generation unit that generates the ions to be output toward the target space;

a static eliminator communication unit that receives the first information signal and the second information signal output from the sensor communication unit of the ion balance sensor;

an ion control unit that controls the ion generation unit based on the first information signal received by the static eliminator communication unit; and an environmental state storage unit that stores the information regarding the environment of the target space based on the second information signal received by the static eliminator communication unit.

9. The static elimination system according to claim 8, wherein the first information generation unit, the second information generation unit, and the sensor communication unit are mounted on one or a plurality of circuit boards, the ion balance sensor further includes:

a sensor housing to which the detection plate is attached, the sensor housing accommodating the one or plurality of circuit boards;

a relay cable configured to be capable of connecting any of the one or plurality of circuit boards to the static eliminator, the relay cable transmitting the first information signal and the second information signal output from the sensor communication unit to the static eliminator; and a first power supply unit that supplies power to the first information generation unit, the second information generation unit, and the information transmission unit, the static eliminator further includes a second power supply unit, and the relay cable is further configured to be capable of supplying power from the second power supply unit to the first power supply unit.

10. The static elimination system according to claim 8, wherein the second information generation unit includes:

a fixed resistor;

a modulation voltage source that is electrically connected to a node, electrically connected to the detection plate, via the fixed resistor and generates a modulation voltage having periodicity;

a potential detection unit that detects a potential of the node over time; and an ion amount detection unit that detects an amount of ions flowing in the target space based on a magnitude of an amplitude of a voltage waveform detected by the potential detection unit, and the second information signal includes a signal indicating the amount of the ions detected by the ion amount detection unit.

* * * * *